Sept 10, 1957

J. R. BOYKIN 2,805,542

SPEED AND TEMPERATURE RESPONSIVE CONTROL FOR
JET ENGINE NOZZLE AND FUEL SUPPLY

Filed Nov. 4, 1950

INVENTOR
John R. Boykin.
BY
F. E. Browder
ATTORNEY

INVENTOR
John R. Boykin.
ATTORNEY

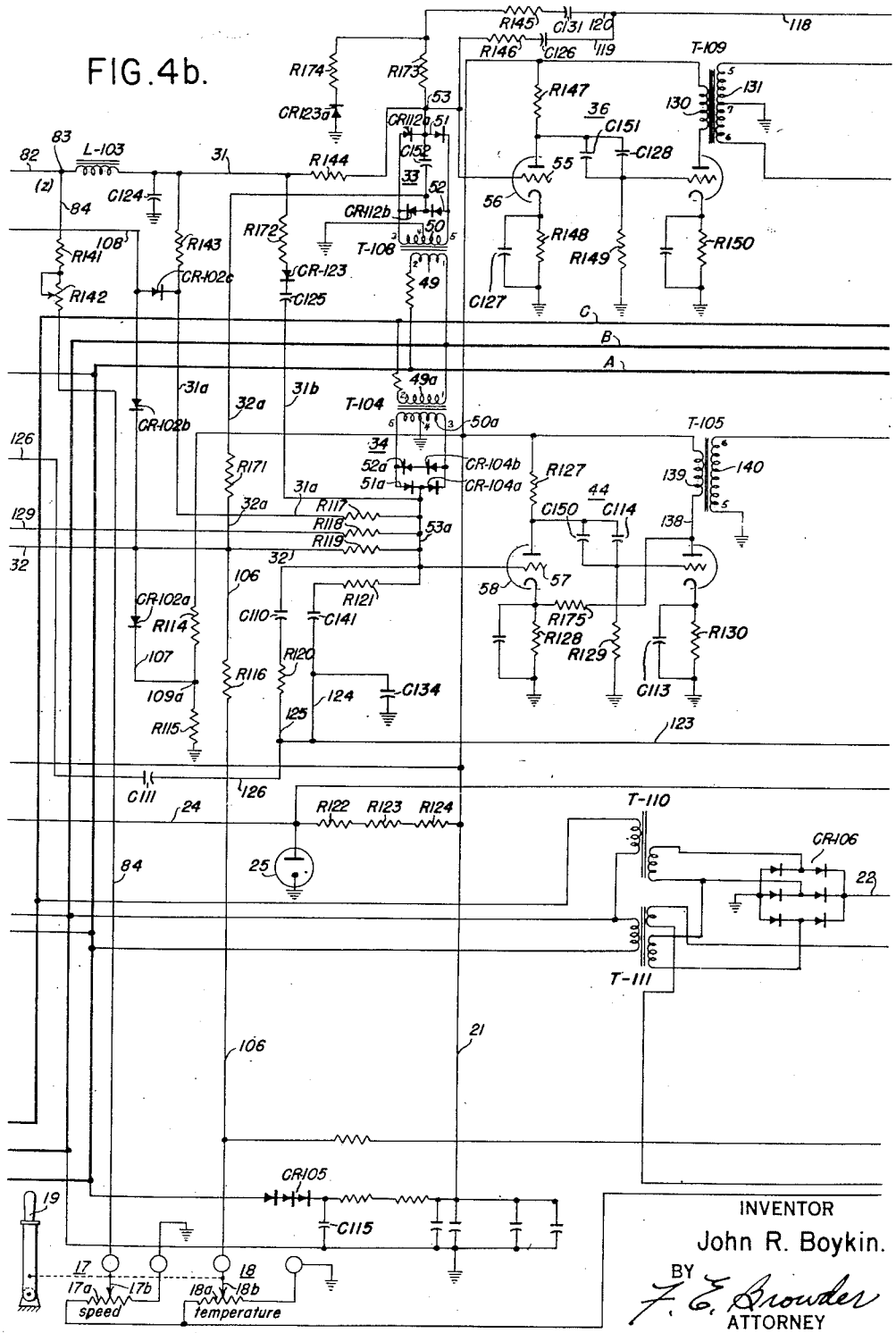

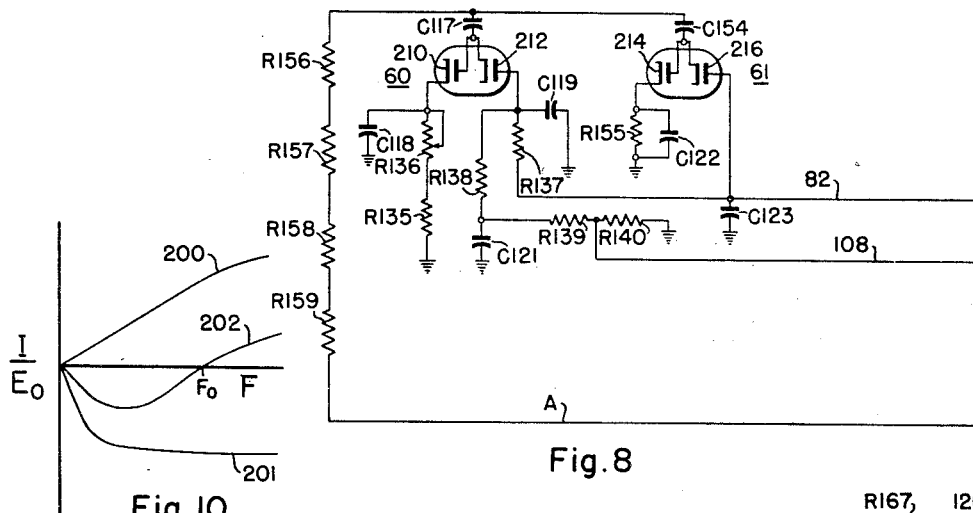
Fig. 10.
Fig. 8.
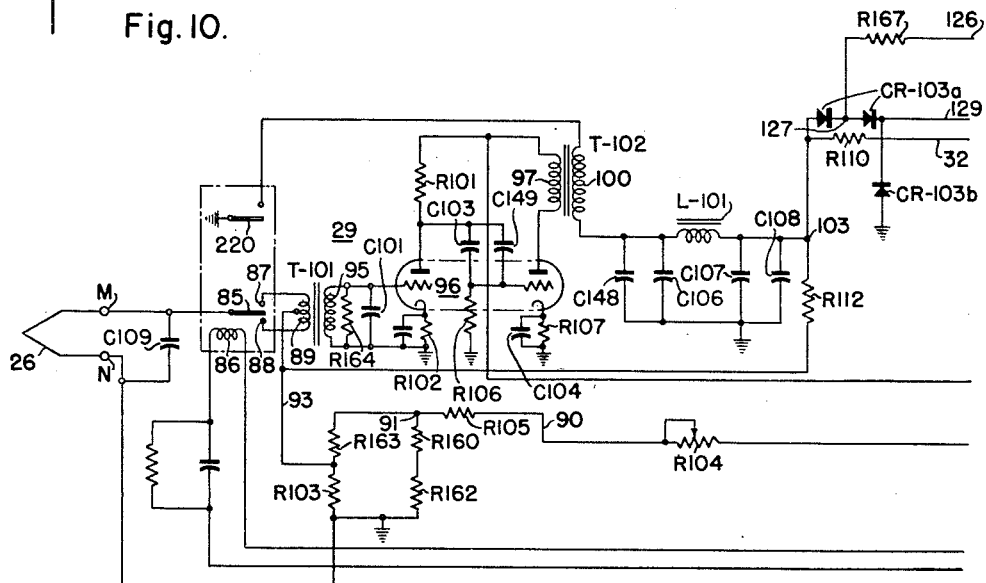
Fig. 9.
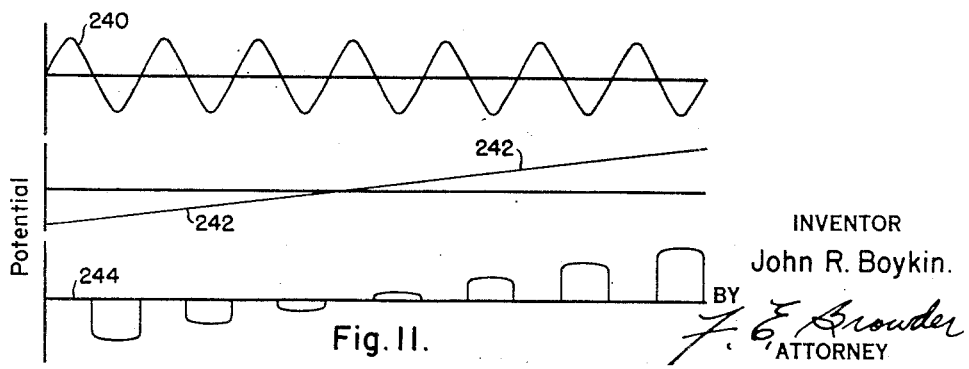
Fig. 11.
INVENTOR
John R. Boykin.
BY F. E. Crowder
ATTORNEY United States Patent Office 2,805,542
Patented Sept. 10, 1957

2,805,542

SPEED AND TEMPERATURE RESPONSIVE CONTROL FOR JET ENGINE NOZZLE AND FUEL SUPPLY

John R. Boykin, Baltimore, Md., assignor to Westinghouse Electric Corporation, East Pittsburgh, Pa., a corporation of Pennsylvania Application November 4, 1950, Serial No. 194,153

40 Claims. (Cl. 60—35.6)

My invention relates to the control of a jet engine having a fuel valve and a variable exhaust nozzle and, more particularly, of such an engine provided with means operative in response to the speed and temperature of the engine to control automatically the operation of the fuel valve and the exhaust nozzle for adjusting the thrust of the engine. In certain of the more general aspects, my invention is applicable to an engine of any type.

My application is related to an application of Cyrus F. Wood, filed October 13, 1949, Serial No. 121,171, now Patent No. 2,734,340, and assigned to the Westinghouse Electric Corporation.

A jet engine of the type primarily under consideration involves three variables, namely, engine speed, nozzle area and engine temperature, any two of which may be varied, with the third fixed in relation thereto, to vary the thrust. In its broader aspects, the present invention contemplates movement of a manual throttle lever to increase the thrust by increase in fuel input for operation to the extent of the maximum temperature the engine will stand. Preferably, however, movement of the throttle lever for increase in thrust involves speed and temperature controlling effects or signals for controlling the fuel input and the exhaust nozzle discharge area for development of propulsion thrust over the thrust range. From idling to about 75 or 80% of full engine speed, the speed signal is used to control increase in fuel input for increase in engine speed and thrust; and, while the speed signal also tends to operate the exhaust nozzle to increase the nozzle discharge area, as such nozzle is already in maximum area-defining position over this engine speed range, it has no effect thereon, with the result that increase in power, represented by increase in fuel input, is effective for rapid engine acceleration. With the engine operating at 75 or 80% of full speed and the exhaust nozzle in maximum area position, the thrust may be increased over a relatively much larger percentage of the thrust range by a small percentage of engine speed change coupled with restriction in nozzle area. While each of the speed and temperature signals exert effects on the exhaust nozzle and on the fuel input, they do so differently in actual practice—the speed signal tending to increase the fuel input and the exhaust nozzle discharge area when actuated from the idling to the full engine speed positions and the temperature signal tending to increase the fuel input and to reduce the exhaust discharge area to increase the thrust when actuated over this range.

Preferably, control of the engine is effected electrically, the engine driving an alternator operating through a frequency meter and amplifiers to control the exhaust nozzle and the fuel valve, and a voltage responsive to temperature is amplified and serves also to control the nozzle and the fuel valve. Such network includes settings adjustable manually to change the fuel input or the latter and the nozzle area to vary the thrust.

An object of the invention is to provide an electronic control apparatus for a jet engine.

Another object of the invention is to provide an automatic control apparatus for a jet engine which is reliable in operation, economical of manufacture, and of small weight and dimensions so that it is readily usable in aircraft.

Still another object is to provide electronic apparatus for automatically controlling the fuel valve of a jet engine in response to the speed and temperature of said engine.

A further object is to provide electronic apparatus for controlling the exhaust nozzle area of a jet engine in response to the speed and temperature of that engine.

A still further object is to provide automatic control apparatus for controlling the fuel input and exhaust nozzle area of a jet engine in response to the speed and temperature of said engine and a manual control provided to indicate desired operating speed and temperature.

A further object of the invention is to provide apparatus of the above character which shall operate with the utmost safety.

Another object of the invention is to provide means operating automatically in response to speed and temperature to control both the exhaust nozzle discharge area of a jet engine and the fuel valve thereof together with manually-operable means for adjusting the automatic means to vary the jet thrust.

A more particular object of the invention is to provide apparatus for varying the propulsion jet nozzle and the fuel input automatically by means acting in response to speed and temperature such that, in response to speed changes, the jet nozzle and the fuel valve are moved to increase the nozzle area and the fuel input or to reduce such area and the fuel input, and, in response to temperature changes, the nozzle and fuel valve are moved to reduce the nozzle area and increase the fuel input or to increase the nozzle area and reduce the fuel input, depending upon the direction of temperature change, together with a member movable manually to adjust said automatic means to vary the thrust.

A further object of the invention is to provide a jet engine power regulator wherein manually-operable means acts through electrical means varied automatically in response to speed to control the exhaust nozzle and the fuel input for variation in jet thrust.

A more particular object of the invention is to provide a jet engine with an exhaust nozzle and fuel valve, manually-adjustable speed and temperature settings, means responsive to engine speed and temperature and normally balancing the settings, and operative in response to setting adjustment to adjust the exhaust nozzle and the fuel valve for engine operation to restore balance.

A further object of the invention is to provide, with a jet engine having an adjustable exhaust nozzle and a fuel valve, an electrical system responsive to manual settings and to speed and temperature for controlling the exhaust nozzle discharge area and the fuel input so that, by operation of the settings, the fuel valve and nozzle may be automatically controlled for engine operation to develop thrust over the full thrust range.

Another object of the invention is to provide electroresponsive control means for effecting selective automatic control of power of a gas turbine power plant in correlation with operating temperature.

Still another object is the provision of control means of the above character responsive to speed and temperature to control only the fuel input where the exhaust nozzle has a fixed area, or, where the nozzle is of the variable area type, to control both the nozzle area and the fuel input.

More particularly, the invention involves an electronic power regulator controlling the exhaust nozzle and the fuel valve. The regulator includes an alternating-current generator driven by the engine, direct-current sources, and speed and temperature settings, arranged in the cockpit and operable by means of a throttle lever. Speed and temperature direct current voltages are derived from the alternator output and cooperate with setting direct current voltages from the speed and temperature settings to provide, in the event of deviation of the derived and setting voltages from balanced relation, direct-current speed and temperature signals, the polarity of each of which depends upon the direction of deviation. A frequency determining network is provided to measure the frequency of the alternator, and, therefore, the speed of engine, at all times during operation. Temperature is measured by a thermocouple properly disposed in the engine.

There are provided two modulators, one being the exhaust nozzle modulator and having its output supplied to an electronic amplifying network to control a servo for operating the exhaust nozzle and the other being the fuel input modulator and having its output supplied to an electronic network controlling a servo-motor for operation of the fuel valve to vary the fuel input. Each of the modulators is supplied with direct-current inputs including said speed and temperature signals and with alternating-current input supplied from the alternator, and operates to provide an alternating-current output, the amplitude of whose wave is proportional to the direct-current input and which output, at alternator frequency, is impressed on the exhaust nozzle and fuel valve electronic control networks. As long as the resultant signal input is zero for each modulator, the alternating-current output of each to its respective electronic network is zero; however, if the signal has a negative or positive polarity, the modulator has an alternating-current output at alternator frequency with the output wave for a negative signal input 180 degrees out of phase relative to the output when the signal is positive. If the speed signal is negative, the alternating-current outputs of the modulators tend to open the exhaust nozzle and to open wider the fuel valve; and, if the speed signal is positive, the contrary operation takes place, the tendency being for the exhaust nozzle to close and for the fuel valve to move in a closing direction. If the temperature signal goes negative, the fuel valve modulator responds in the same way as for a negative speed signal, that is, it causes the fuel input to increase; however, because of the different way in which the temperature signal is applied to the exhaust nozzle modulator, the alternating-current output of the latter will be 180 degrees out of phase compared to its output for a negative speed signal, in consequence of which the exhaust nozzle discharge area will be restricted. If the temperature signal goes positive, the contrary operation takes place.

When the engine reaches a certain temperature above which safety may be in question, temperature control overrides all other controls. With the engine above this safe temperature the control operates to cut down fuel supply regardless of the settings of any of the control components. In the control of an engine equivalent to the J-34 engine (Navy nomenclature) the maximum safe temperature is 1250° F. Above this temperature the control operates to cut down fuel supply. If the temperature reaches 1400° F., fuel supply is abruptly cut to minimum flow.

In addition to the signal inputs to the exhaust nozzle and fuel valve modulators, additional inputs are supplied thereto. A stabilizing feedback input controlled by movement of the exhaust nozzle is supplied to the exhaust nozzle modulator, and the feedback connection is arranged so that a smaller speed or temperature signal is required for moving the exhaust nozzle in a closing direction than in an opening direction. Aside from speed and temperature inputs supplied to the fuel valve modulator, the latter has a stabilizing feedback input and a temperature-limiting input controlled by movement of the fuel valve, the purpose of the temperature limit being to anticipate temperature, that is, to prevent overtravel of the fuel valve in an opening direction and consequent oversupply of fuel and overheating of the engine.

The frequency determining circuit including the voltage doublers is analogous to a circuit shown in Fig. 4 of British patent specification 619,139. This latter circuit includes a frequency doubler comprising a capacitor C1, the output of which varies with frequency and a second frequency doubler including capacitor C4, the output of which varies with the amplitude of the impressed voltage. In the British system the output voltages of the frequency doublers are balanced against each other and a correcting voltage is derived through conductor 1. In operation, I have found that a jet engine including a circuit of this type, at times vibrates violently.

Accordingly, one specific object of my invention is to provide a control for a jet engine which control shall not produce violent vibrations in the operation of the jet engine.

The aspect of my invention involving this object arises from my realization that the cause of the violent vibration may be ascribed to the British frequency determining network. The components of the British system are so related that if a sudden change takes place in an external voltage (such as may be caused by load change on the alternator due to the firing of the fuel valve control thyratrons to change the fuel flow to the engine and hence alternator speed), the output conductor 1 would carry a transient pulse which would produce a transient disturbance in the system to which the frequency determining device is applied. This transient pulse so derived at the output conductor would cause the voltage output of the alternator to change suddenly, which would, in turn, introduce a sudden counter-change into the correcting circuit which would, in turn, cause a corresponding sudden counter-change in the alternator. This periodic operation would give to the engine and the craft on which it was mounted an objectionable and vigorous vibration.

An ancillary object of the invention is accordingly to provide an improved frequency responsive network which is less subject to objectionable transients than those of the prior art.

An additional ancillary object of the invention is to provide an improved frequency responsive device which will satisfactorily function under the conditions of jet engine control operation.

A further ancillary object is to provide a frequency responsive network which will give a reliable and accurate indication of jet engine operational speeds, with particular emphasis on the maximum safe-operational speed.

A still further ancillary object is to provide a frequency responsive apparatus which can be made an operationally integral part of an electronic control apparatus for a jet engine.

My invention is based on the realization that the transient difficulty springs from the fact that the transients are caused by the relationship between the impedances in the circuit of the British voltage doublers. The resistor R1 is of too great value compared to the resistor R3 (600,000 ohms as compared to 47,000 ohms) and the relationship between the capacitor shunting the resistor R3 and the capacitor C1 is not proper. Because of this relationship, a sudden change resulting in a pulse supplied through the capacitor C1 is in no respect counter-balanced by an opposite polarity signal applied through the resistor R1 which is of very high magnitude.

In accordance with my invention, a frequency determining network is provided in which the resistors and the capacitors are so related that any transients produced by a sudden change in the voltage impressed from conductor A are suppressed.

An aircraft engine failure due to overheating of the turbine blades is of paramount concern when it is considered that the normal operational temperatures are in general and especially in military craft, chosen to be close to the maximum safe operating temperature of the metal used in the turbine blades. This temperature is measured by suitably disposed thermocouples which produces a relatively low direct current voltage to indicate a given temperature. The output voltage of the thermocouples, even when approaching maximum operational temperatures, is very small and the necessary comparison between the actual operating temperature at any given instant and the maximum allowable temperature to determine the engine control is effected by observing a change in a very low voltage.

Another problem, which accordingly had to be overcome in making an operable automatic control device capable of extremely rapid response to the engine temperature, was to provide apparatus for amplifying this very low level direct-current output voltage and for converting the minute differences measured at the input into respectable differences capable of effecting positive control operations.

Accordingly, another object of the invention is to provide a network capable of amplifying very low level direct-current output voltages such as those delivered by thermocouples, photo cells, and so forth.

A still further object is to provide apparatus for maintaining a constant positive and accurate comparison between the actual operational temperature of the engine and that temperature above which the engine is expected to fail.

Still another object is to provide a voltage comparison circuit for engine temperature in which the greatest degree of accuracy occurs when the difference between the actual operational temperature of the engine and the maximum allowable temperature is the smallest.

An ancillary object is to provide an alternating-current amplifier for the thermocouple output voltage which shall give an amplified direct-current voltage output.

An additional ancillary object of my invention is to provide a sensitive amplifier of simple structure which shall respond to a low voltage direct-current input to produce a direct current output of substantial voltage.

In the operation of a jet engine, separate direct-current voltages respectively for speed and temperature are manually preset by the aircraft pilot. These voltages must be compared with direct-current signal voltages which respectively measure the speed up and temperature operational conditions of the engine, and are derived from the engine components which are controlled and detection apparatus suitably disposed to measure the actual speed and temperature of the engine. One of these latter derived signals, the direct-current speed signal, is dependent on the output of an alternator operated by the engine, and is measured by a frequency determining network which gives an output direct-current speed signal corresponding to the frequency of the output voltage from said alternator. Another of the latter derived signal voltages is measured by thermocouples suitably disposed to determine the operational temperature of the jet engine. It is desirable that any change in the values of the preset voltages or the derived voltages will produce immediate correcting action in the operation of the engine.

It is, accordingly, an object of my invention to provide a servo-system which is responsive to a plurality of command signals and which shall operate promptly and precisely to produce correcting action.

My invention arises from the realization that polarity changes are more readily identifiable by electrical pick-up components than magnitude changes. In accordance with my invention, the preset voltages and the derived signal voltages are balanced against each other so as to supply a zero output voltage to the pick-up device during steady state operation of the engine. So long as the preset voltages are fixed, and the engine speed and temperature remains constant, this output remains at a zero magnitude and the operation of the engine does not vary. If, however, the preset voltages are changed by the aircraft pilot or the engine speed or temperature changes slightly, a positive or negative resultant net voltage is impressed on the pick-up devices.

It is desirable that a sensitive system be provided to respond to this positive or negative net voltage to produce the desirable correcting action. The necessary sensitivity and accuracy can not be achieved readily by providing an ordinary direct-current amplifier to amplify the small positive or negative signal voltage derived from such a balance. The primary deficiency in a direct-current amplifier resides in the difficulty of maintaining all of the plate and filament supply voltages constant. This deficiency may not be serious where a relatively large direct-current signal is available. In such a case, the amplifier may have so low a gain that the effect of plate voltage regulation and the temperature of the cathodes is relatively negligible. For a low level signal, however, the temperature of the cathodes can not readily be tied down to the necessary order of accuracy. If an alternating-current amplifier, the input is alternating. The frequency of the input may be selected so high that the effect on the alternating output of temperature variation of the cathode and variations of the potentials on the various elements merely causes a change of static conditions and does not show up in said output as an objectionable alternating-current signal. Therefore, in a situation involving thermocouple inputs, alternating-current amplification is to be preferred.

An ancillary object of my invention is accordingly to provide a sensitive alternating-current control circuit for the jet engine to respond to the direct-current speed and temperature indication signals.

It is another ancillary object of the invention to provide suitable sensitive means for amplifying the direct-current and temperature signals to control the fuel valve and exhaust nozzle prime movers.

A further ancillary object is to provide modulation apparatus for generating alternating-current control voltages corresponding to an available direct-current signal voltage.

My invention arises from my realization that in the region of zero net signal voltage, only the polarity of the signal voltage need be detected, and that the polarity may be made dependent on the phase of an alternating-current voltage. The latter may be amplified by an ordinary alternating-current amplifier. Accordingly, I provide a pick-up system including a pulsation voltage generator which is responsive in phase to the polarity of the voltage impressed on it.

The fuel valve control presents a problem with regard to the necessarily very sensitive control of its operation in response to the variable direct-current speed and temperature signals. The control of the electric motor employed to operate the fuel valve must be highly sensitive and at the same time sufficiently versatile in its operation to impart to the motor under certain conditions of engine operation a relatively small movement and under other conditions of engine operation a very rapid and extensive movement. These two conditions in general impose opposite limitations in design. With these conditions impressed, the variable polarity direct-current speed and temperature signals have to be answered by the fuel valve control to cause the fuel valve to regulate the fuel flow to the engine depending upon the desires of the aircraft pilot and the safety considerations of the engine operation.

Accordingly, another object of the invention is to provide control means for the fuel valve which shall respond to the variable direct-current speed and temperature signals to produce the desired control.

A further object is to provide fuel valve control apparatus which was very sensitive in its response, and meets the necessary safety standards for reliable operation, such as those encountered in the regulation of aircraft jet engines.

A still further ancillary object is to provide a fuel valve control which is economical to manufacture and practical from a commercial standpoint.

In accordance with my invention, the control valve motor is supplied with successive current pulses of opposite polarity which are balanced against each other in the motor armature. When the amplitude of the pulses of one polarity exceeds the amplitude of the other pulses, the motor rotates in one direction or the other. The pulses are derived from a phase discriminator including a pair of thyratrons which are connected to supply currents of opposite polarity to the motor and are responsive to signals impressed on them from phase sensitive network. The thyratrons are supplied with alternating potentials of different phases and are fired at instants in the half periods of the supply which are dependent on the output of the phase sensitive network.

When the motor rotates, it impresses a back electromotive force tending to counteract the driving potential; that is tending to reduce the current through the thyratron supplying the larger pulses. If the input signal is small, the back electromotive force effects this counteraction after the motor has reached a small angular velocity. The motor therefore moves rather slowly and is sensitive to small signal changes. If a large signal is abruptly applied, the counteracting effect does not become effective immediately and the motor reaches a substantial speed. Additional damping of the input effect is achieved by feeding back to the input of the thyratrons a signal proportional to the rate of travel of the fuel valve. This control operates at a high speed. A fuel valve control actually constructed in accordance with my invention is capable of actuating the valve from minimum flow to maximum in approximately one quarter of a second. This control can also be set, by reducing the input signal voltage to actuating the valve over its range of operation in an interval of the order of one minute.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing, in which:

Figure 6:
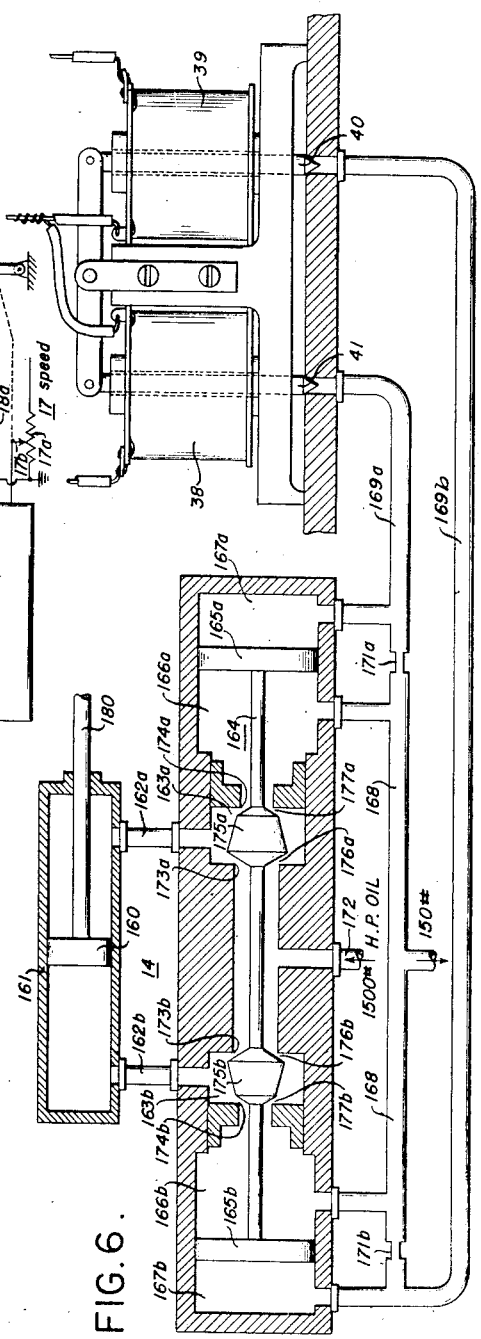
Figure 7:
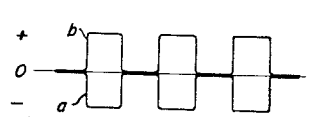
Figure 4A:
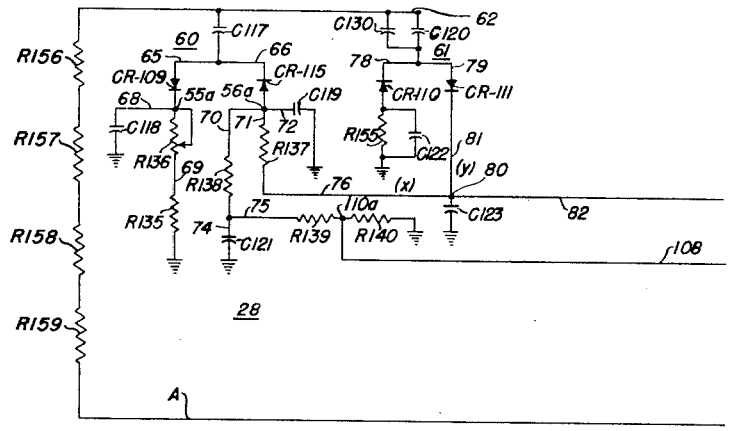
Figure 4A:
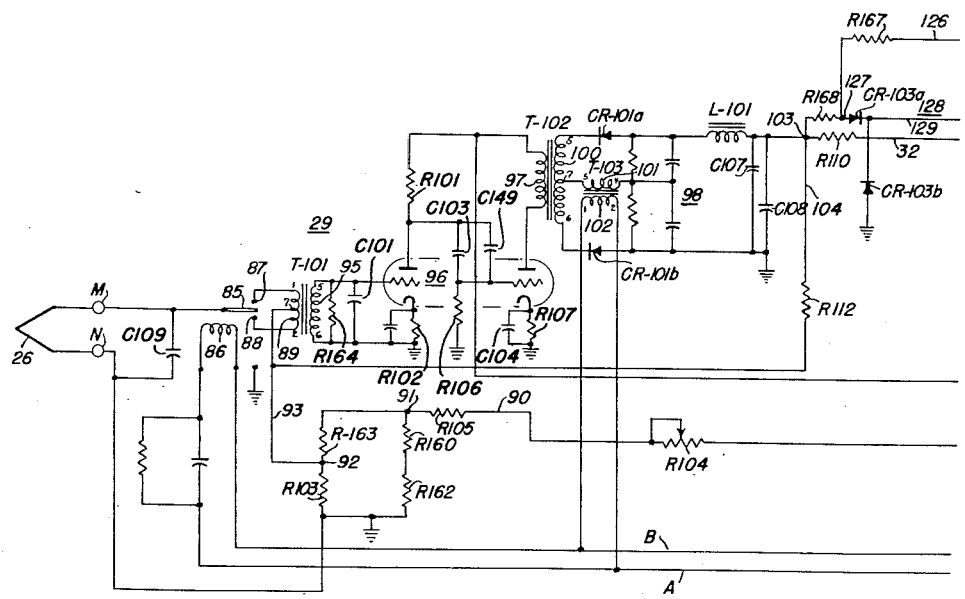
Figure 4A:
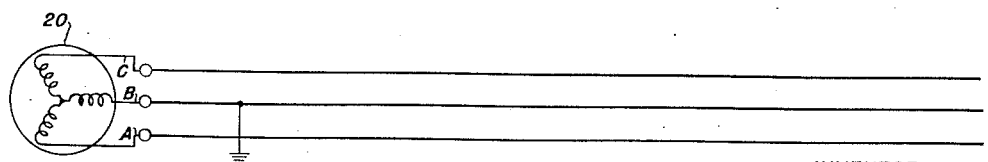
Figure 4C:
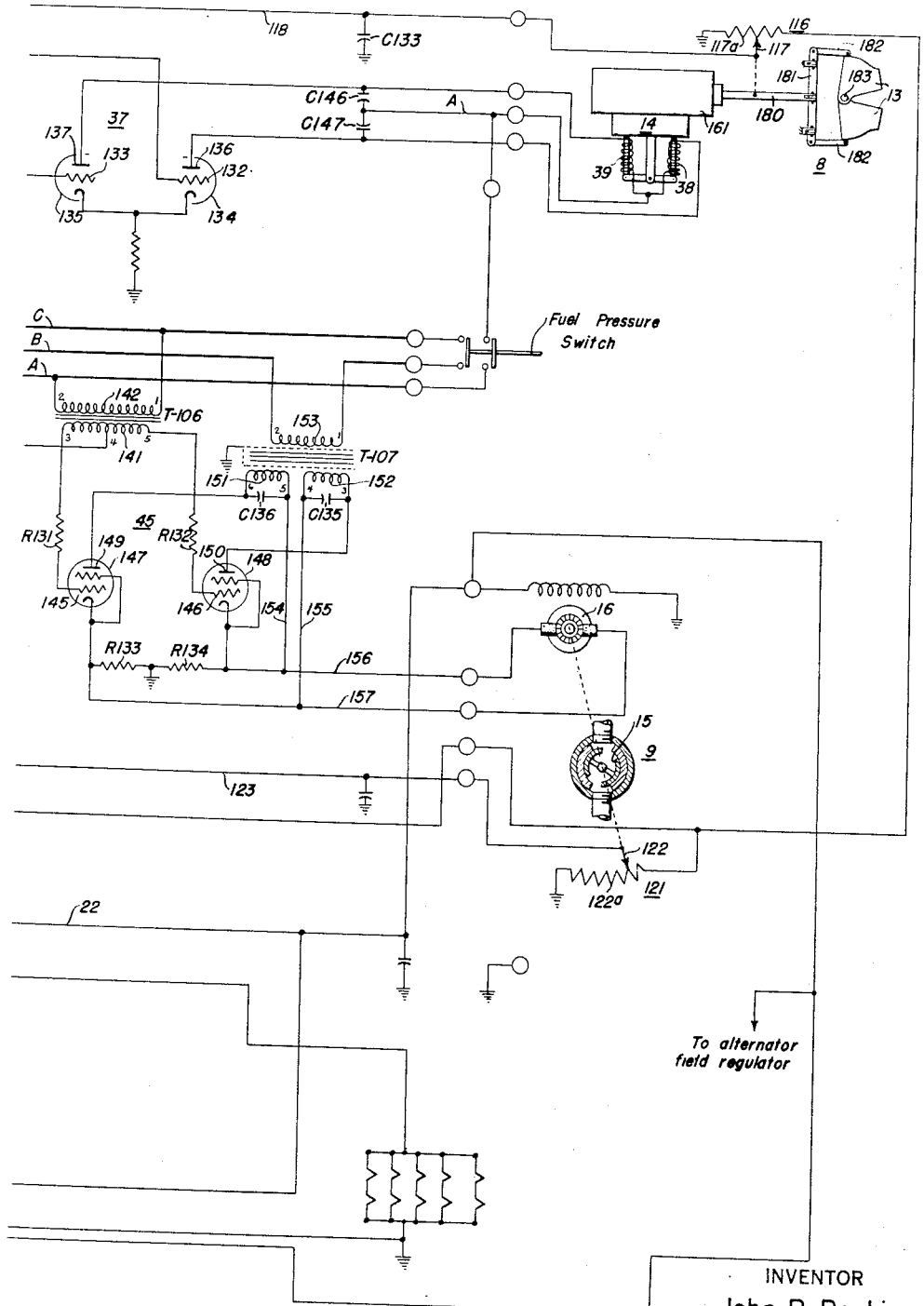
Figure 5:
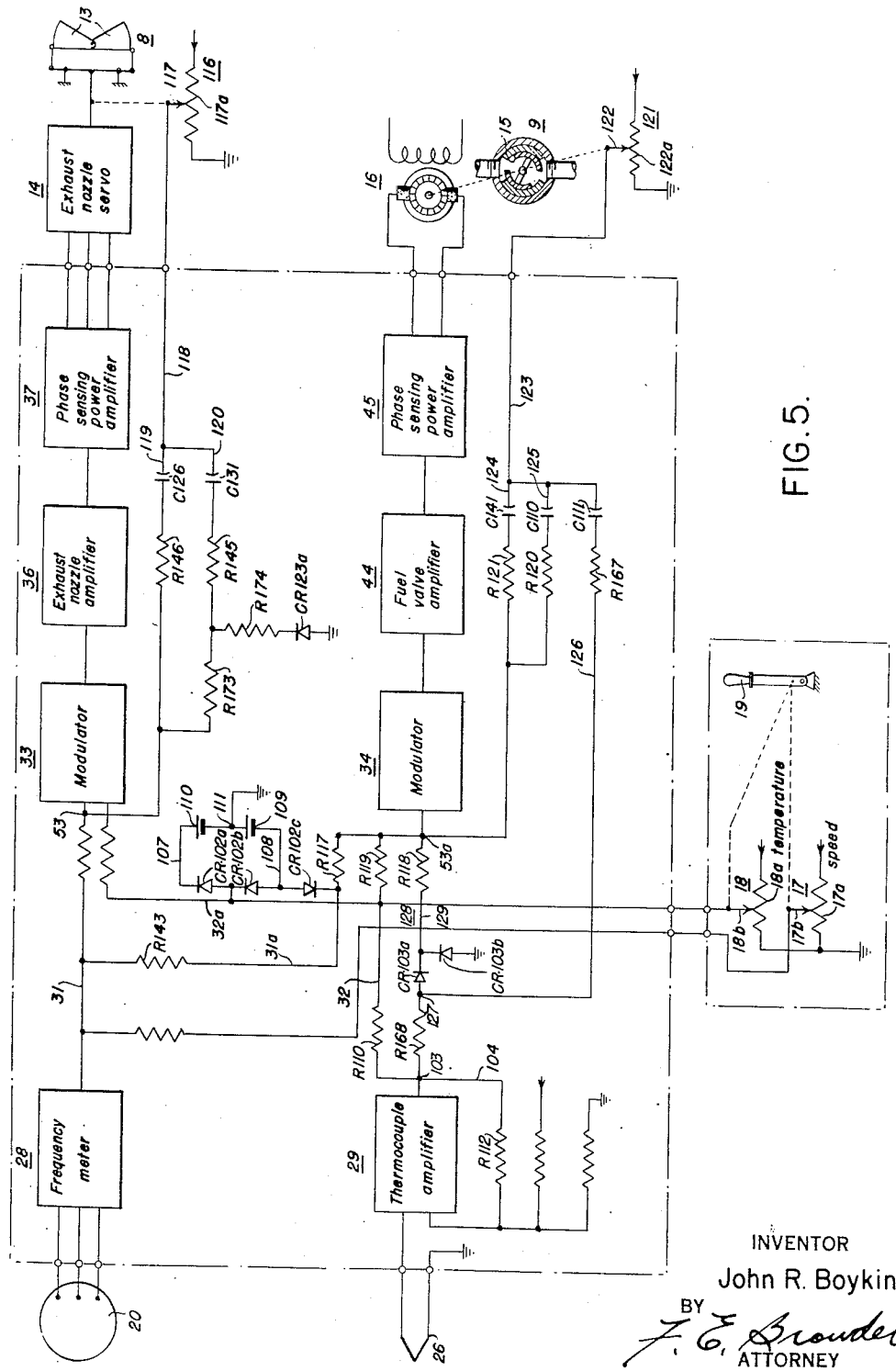

Figs. 4a, 4b and 4c, when placed side-by-side in the order given, constitute the wiring diagram of the regulator which constitutes a preferred embodiment of my invention;

Fig. 5 shows a block diagram of the regulator shown in Fig. 4;

Fig. 6 is a view partly in section and partly in side elevation of a teeter valve for the exhaust nozzle servo of the jet engine;

Fig. 7 is a graph illustrating the operation of a modulator included in the regulator shown in Fig. 4;

Fig. 8 is a circuit diagram of a frequency meter embodying a modification of one aspect of my invention;

Fig. 9 is a circuit diagram of a thermocouple amplifier network embodying a modification of another aspect of my invention;

Fig. 10 is a graph illustrating the operation of the frequency meter network included in Fig. 4 as shown in Fig. 8;

Fig. 11 is a graph illustrating the operation of the modulator circuit used in the practice of my invention.

Figure 1:
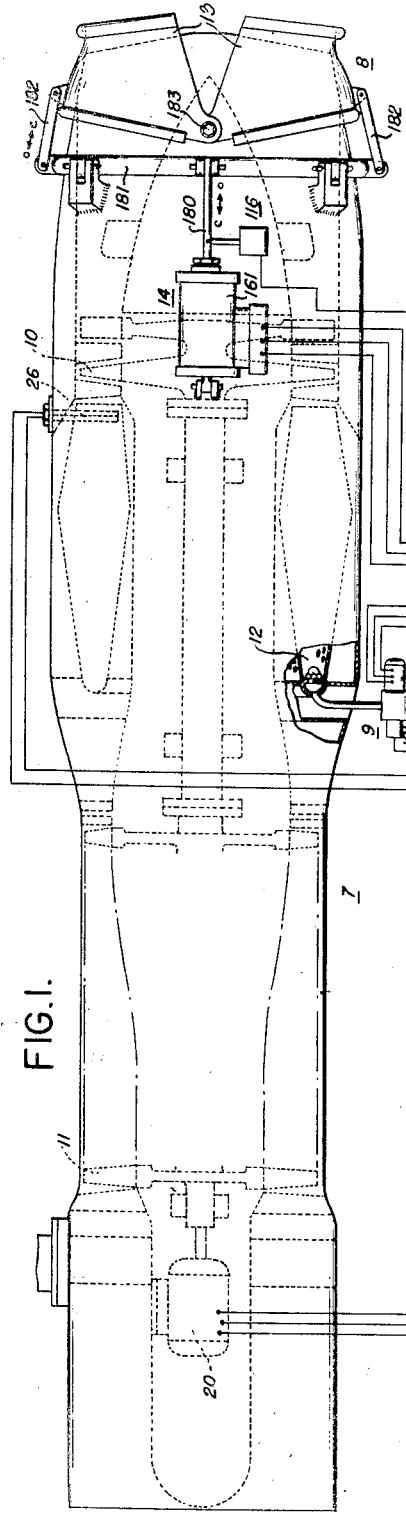
Figure 1 is a diagrammatic view of a jet engine, the operation of which may be controlled by a regulator in accordance with my invention.

In Fig. 1, there is shown a jet engine 7 having an adjustable exhaust or propulsion jet nozzle 8 and fuel valve 9. In addition to the fuel valve and the jet nozzle, the engine comprises a turbine 10, a compressor 11, and a combustor 12, the compressor delivering air to the combustor for generation of motive fluid to drive the turbine, the turbine driving the compressor and the exhaust from the turbine undergoing further expansion in the nozzle to provide the propulsion jet. The exhaust nozzle has a component or components 13 moved by the servo-motor 14 to vary the exhaust nozzle discharge area and the fuel valve 9 is controlled by the servo-motor 16 to vary the fuel input.

Jet thrust is varied by manual adjustment of a setting of a power regulator controlling the fuel input, or the latter and the exhaust nozzle area, in response to engine speed and temperature. As shown in Fig. 1, the regulator has speed and temperature settings, at 17 and at 18, operated by a throttle lever 19. Upon movement of the lever 19 for setting adjustment, the balanced relation of the regulator is disturbed and the latter is thereby rendered effective to adjust the fuel valve, or the latter and the exhaust nozzle, for engine operation to restore the balanced relation and thereby to vary the jet thrust in accordance with lever movement.

Figure 2:
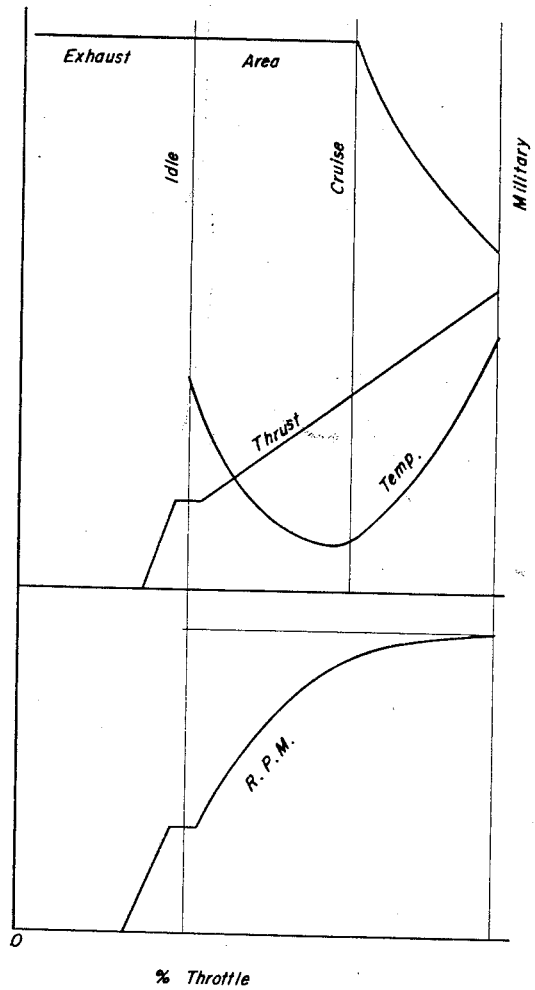
Fig. 2 is a graph showing exhaust nozzle discharge area, thrust, temperature, and speed variations as a function of throttle position for the jet engine shown in Fig. 1.
Figure 3:
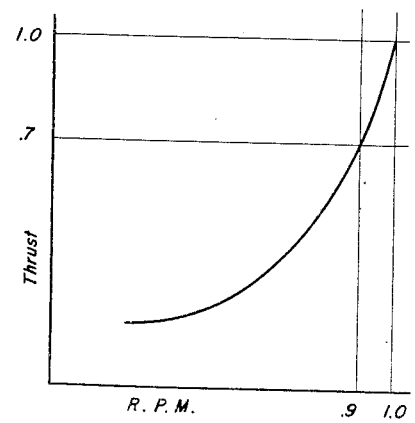
Fig. 3 is a graph showing the relation of thrust to engine speed at the upper end of the speed range for the jet engine.

Referring to Figs. 2 and 3, with the engine idling, as the throttle lever is moved in the direction of increased speed and thrust, the changing temperature setting has no effect on the automatic control mechanism until the speed reaches about 75 or 80 percent of full speed, the control during this acceleration period being mainly in response to speed with the exhaust nozzle fully open. At about this fractional speed, the temperature control comes into play mainly for the purpose of closing the exhaust nozzle so that in going from said 75 to 80 percent speed point to full speed, the ratio of thrust change to speed change rapidly increases with the result that, at full speed, and as may be seen from Figs. 2 and 3 and particularly Fig. 3, only a very small percentage of speed change is required for a large percentage of thrust change. Therefore, while the operator moves the throttle lever to vary the thrust, this result is accomplished by varying the nozzle and the fuel input through the intermediary of the automatic control arrangement responsive to speed and temperature, the arrangement assuring of correlated operation of the exhaust nozzle and fuel valve in response to speed and temperature with the maximum development of thrust without going to temperatures too high for allowable turbine toleration.

As shown in Figs. 4a, 4b, 4c the power regulator includes, in addition to the speed and temperature settings, at 17 and at 18, a three-phase alternator 20 (Fig. 4a) driven by the engine; rectifiers CR–105 and CR–106 (Fig. 4b) supplied from the alternator 20 and furnishing direct current to the lines 21 and 22, the line 21 supplying current through the resistances R122, R123 and R124 to the line 24 provided with the voltage regulating tube 25; and a thermocouple 26 providing a direct-current output applied to the terminals M and N (Fig. 4a). The line 22 provides direct-current voltage for field excitation of the fuel valve motor 16 (Fig. 4c), for the alternator 20 field regulator and for the resistances 17a and 18a of the settings, at 17 and at 18, and connected in parallel to ground, the settings also including sliders 17b and 18b moved by the lever 19 along the resistances to reduce the slider voltages relative to ground for increase in speed and temperature. The line 21 provides plate voltage for various tubes; and the line 24 provides a fixed voltage supply for exhaust nozzle and fuel valve feedback potentiometers 117a and 122a, respectively, and to give a reference for the temperature-responsive means 29.

The regulator includes speed and temperature networks, respectively, at 28 and 29 (Fig. 4a), which, in conjunction with the speed and temperature settings, at 17 and at 18, provide direct-current signals supplied by the lines 31 and 32 to the exhaust nozzle modulator, at 33, and to the fuel valve modulator, at 34, and each of the modulators has an alternating current output, whose frequency is the same as that of the alternator, and whose amplitude and phase, respectively, depend upon the magnitude and polarity of the direct-current speed and temperature signals.

The output of the modulator 33 is amplified in an alternating-current exhaust nozzle amplifier 36 and then used to energize the phase-sensitive amplifier 37, whose output is employed to energize either of the magnet windings 38 and 39 for actuation of the teeter valves 40 and 41 (see Fig. 6) to cause the hydraulic exhaust nozzle servo-motor 14 to move the exhaust nozzle component or components 13 to vary the exhaust nozzle discharge area.

The output of the fuel valve modulator 34 at alternating frequency is supplied to the fuel valve amplifier, at 44, whose output is furnished to the phase-sensitive power stage 45, furnishing direct-current to the reversible motor 16 to move the fuel valve member 15 in either direction.

The speed signal line 31 supplying the modulator 33 has a branch 31a for supplying such signal to the fuel valve modulator 34 so that, with a signal tending to open the exhaust nozzle, such signal opens wider the fuel valve to increase the fuel input. While the temperature signal line 32 is connected to both modulators, the connection thereof by the branch 32a to the modulator 33 is made in such a manner that a change in the temperature signal to open wider the fuel valve is accompanied by restriction of the exhaust nozzle.

*Speed-sensitive network*

The speed-sensitive network 28 comprises (Fig. 4a) a reference component 60, a frequency-responsive component 61, and the manual setting at 17. In operation, the currents provided by the reference component 60, by the frequency-responsive component 61, and by the manually-operable setting 17 are in balanced relation, with the result that, if the setting voltage is changed, current is supplied to or drawn from the modulator 33, through the speed signal line 31. As shown in Fig. 4b, for increase in speed of the engine, adjustment of the speed setting 17 lowers the setting voltage so that current is drawn from the signal line 31, thereby giving a negative speed signal to the modulator 33, which brings about an increase in exhaust nozzle area and fuel input to increase the speed of the engine until balance is restored. Since the setting 17 direct-current voltage is obtained from the alternator 20 through rectifiers, regulation is improved with decrease in setting voltage to increase the speed; the closest regulation is predetermined to be secured at top speed when the setting voltage is zero. Thus, as the apparatus balances or zeroes at top or maximum speed, it is definite and stable in its operation.

The reference component 60 comprises an impedance and rectifier network of the doubler type and it includes a condenser C117 connected to phase "A" through relatively large line resistors which decrease the effect of harmonics on the system. The frequency-responsive component 61 includes parallel condensers C120 and C130 connected to phase "A." The capacity of the condenser C117 is relatively large compared to that of the parallel-connected condensers C120 and C130 of the frequency counter 61, with the result that the voltage of the former changes quite rapidly with the change in frequency, in consequence of which, for the operating range, a substantially constant reference current and voltage may be provided over a range of frequency variation. On the other hand, because of the relatively much lower capacity of the condensers C120 and C130 of the frequency-responsive network, the frequency-responsive voltage and current vary substantially in linear relation to speed, with the result that a change in setting 17 voltage produces a speed signal which brings about change in engine operation until the said signal is restored to zero under the latter condition of operation, the reference 60, the frequency-responsive component 61, and the setting 17 currents are balanced, and the resultant speed signal on the line 31 is equal to zero. In the subsequent discussion of the graphical representation of the currents shown in Fig. 10 for the reference branch 60 and the frequency responsive branch 61 this circuit is further explained.

In addition to the condenser C117, the reference component 60 includes branches 65 and 66 connected to condenser C117. The branch 65 includes a rectifier CR-109, conductive from the condenser C117 through the parallel branches 68 and 69 to ground, the branch 68 including a condenser C118 and the branch 69 including resistances R135 and R136. The latter speed-setting resistance R136 is adjustable to vary the potential applied to the condenser C118 and, therefore, the voltage drop across the condenser C117 and its charge. The resistance R136 is preferably adjusted for full speed values of the reference component 60 current and voltage.

The branch 66 is connected through the rectifier CR-115, to be conductive toward the condenser C117 from parallel branches 70, 71 and 72. The branch 70 is connected, through resistance R138 and parallel connections 74 and 75 to ground: the connection 74 including the condenser C121 and the connection 75 including the resistances R139 and R140. The branch 71 includes a resistance R137 connected to the reference line 76. The branch 72 is connected through the condenser C119 to ground.

When phase "A" is positive relative to phase "B," conduction from "A" to "B" occurs through the condenser C117, the rectifier CR-109, and the condenser C118. If "B" is positive, then conduction occurs through the condenser C119, rectifier CR-115 and the condenser C117. Since the condensers C118 and C119 are in effect connected in series between 55a and 56a, with the ground, or phase "B," serving as a midpoint connection between the condensers, and since such condensers are charged on successive half cycles, the voltage from 55a to 56a is double the input voltage to C117.

The cycle counter or frequency-sensitive component 61 includes parallel-connected condensers C120 and C130, joining the phase "A" line 62 with the branches 78 and 79. The branch 78 includes a rectifier CR-110 conductive from ground, or phase "B," through the parallel-connected resistance R155 and condenser C122. The branch 79 includes a rectifier CR-111 conductive to terminal 80 to which the reference line 76 is connected. On positive half cycles, conduction occurs through the condensers C120 and C130 and the rectifier CR-111 to the terminal 80. On negative half cycles, conduction occurs from ground, or phase "B," through the parallel-connected resistor R155 and condenser C122, the rectifier CR-110, and the parallel-connected condensers C120 and C130 to line 62. Due to the parallel-connected condensers C120 and C130, there is provided impedance varying inversely to frequency, in consequence of which direct current in the connection 81 is proportional to frequency.

The terminal 80 is connected to ground through the condenser C123, and through the connection 82 to terminal 83 connected to the speed setting line 84 from the speed setting 17 and including resistances R141 and R142, the resistance R142 being an engine idling speed adjustment. The terminal 83 is also connected through the filter including the choke L-103 and the condenser C124, to the speed signal line 31 including the resistance R144.

Representing the reference direct current in the line 76 (Fig. 4a) as "x," the frequency current of line 81 as "y" and the setting current provided by the line 84 (Fig.

4b) as "z," a steady state or balanced condition exists when the terminals 80 and 83 are at equal potentials. This exists when "y" is equal to "x" minus "z." If "z" is decreased with increase in speed-setting, current is drawn through the line 31 from the modulators, that is, a negative speed signal is furnished to the modulators. On the other hand, if "z" is increased, a positive speed signal is applied. In other words, as long as "x" minus "z" is made larged than "y," a negative speed signal is applied, and, when the difference is smaller than "y," a positive speed signal is applied.

To suppress transients and the resultant engine vibration induced thereby, respecting the frequency network components, it was found that, roughly, the capacitor C119 should be of the same magnitude as the capacitor C117, and the capacitor C118 should be 50% greater than the capacitor C117: the resistor R137 should be substantially equal to the sum of resistors R135 and R136. The frequency responsive network 61 has so short a time constant as not to be materially affected by the transients. In a preferred system in accordance with the invention, the resistor R137 has a magnitude of 50,000 ohms; the resistors R135 and R136 combined have a resistor slightly greater than 50,000 ohms (the voltage divider R136 has a maximum resistance of 10,000 ohms): the capacitor C119 has a capacitance of .5 microfarad and capacitor C118 has a capacity of .75 microfarad. In this system the capacitor C117 has a capacity of .5 microfarad. The magnitudes given here were determined by careful selection after it was realized that the objectionable vibrations which arise if a system such as is disclosed in the British Patent 619,319 is used, could be suppressed by such selection.

*Exhaust nozzle modulator*

The exhaust nozzle modulator 33 includes a transformer T-108 having the ends "2" and "1" of its primary 49 connected to phases "A" and "B" and having the ends "3" and "5" of its secondary 50 connected by branches 51 and 52. The branch 51 includes a pair of rectifiers CR-112a conductive from "3" to "5." The branch 52 includes a pair of rectifiers CR-112b conductive from "5" to "3." The secondary 50 has its midpoint "4" tapped to ground. Between the rectifiers CR-112a, the branch 51 is connected to a modulator terminal 53, which is connected to the speed signal line 31, the exhaust nozzle movement feed back line 118, and to the input control grid 55 of the initial vacuum tube 56 of the alternating current amplifier 36.

It is preferred that the secondary voltage of transformer T-108 should be at least twice the range of voltage impressed at point 53 over which range the amplifier 36 operates linearly. For example, if this linear range extends from zero to ¼ volt, the secondary of transformer T-108 should deliver ½ volt of this operation. In the exhaust nozzle modulator 33, assume that the speed signal of line 31 is negative. During the half periods when the left end "3" of the transformer secondary 50 is positive, the rectifier branch 51 is conductive and current flows from ground through the terminal 53 and the resistor R144. During the half periods when the end "3" of transformer T-108 is negative, the junction of the rectifiers 51 floats electrically and point 53 is at the negative potential of line 31 since no current flows through the rectifiers 51. The speed signal, impressed at point 53, thus has the form substantially of a square wave "a" (as shown in Fig. 7). This square wave "a" is impressed on the amplifier control grid 55. On the other hand, if the speed signal is positive, the point 53 becomes positive during the half periods when end 3 of transformer T-108 is negative and the positive square wave "b" (Fig. 7) is produced.

Since the rectifiers CR-112b are in opposite phase relationship with the rectifiers CR-112a, the junction of these rectifiers has a square wave impressed thereof from line 32a which is in opposite phase to the square waves "a" and "b" (Fig. 7). That is, the zero voltages at the 52 junction occur when the non-zero voltages at 53 occur and vice versa.

After amplification, the modulator output wave is supplied to a phase-sensitive amplifier 37, and the servomotor 14 is controlled thereby for operation in one direction or the other dependent upon the speed or temperature signal polarity.

*Exhaust nozzle amplifier and control apparatus*

Referring more particularly to the exhaust nozzle alternating current amplifier 36 and the phase-sensitive amplifier 37, the amplifier 36 has in its plate circuit the primary 130 of a transformer T-109. Said transformer T-109 has a secondary 131 having its upper and lower ends "5" and "6" connected, respectively, to the grids 132 and 133 of two tubes 134 and 135 whose plates 136 and 137 are connected through the magnet windings 38 and 39 to phase "A." The midpoint "7" of the transformer secondary 131 is connected to ground. When the upper end "5" of the transformer secondary 131 is positive at the same time phase "A" is positive, then the tube 134 conducts more than tube 135 and the servo 14 is driven in a direction to open the exhaust nozzle. The converse occurs when the lower terminal 6 of secondary 131 is positive when phase A is positive.

It will be apparent that polarity of the secondary of the transformer T-109, in relation to the alternating current wave applied to the plates 136 and 137, depends upon the phase of the exhaust nozzle modulator 33 output wave. If a negative speed signal is applied to the modulator 33 then the tube 134 is conductive, and the servo 14 is operated to move the exhaust valve in an opening direction. On the other hand, if the signal input to modulator 33 is positive, then the lower end "6" of the transformer secondary 131 will be positive when the plate 137 is positive and the tube 135 is then conductive to energize the winding 39 for operation of the servo 14 to move the exhaust valve in a closing direction. See discussion of Fig. 6 for operation of servo motor 14 per se.

*Exhaust nozzle feedback*

Respecting the exhaust nozzle feedback 116, as the exhaust nozzle opens the potentiometer 117a is operated, and the slider 117 is moved along the resistance 117a in the direction to increase the voltage applied to the feedback line 118 connected by parallel branches 119 and 120 (Figs. 4b and 5) to the terminal 53 of the exhaust nozzle modulator 33. The branch 119 includes the condenser C126 and the resistance R146, and the branch 120 includes the condenser C131 and the resistances R145 and R173. Thus, as the exhaust nozzle 13 opens, the voltage applied to the feedback line 118 becomes more positive to result in conduction through the branches 119 and 120 to neutralize the negative speed signal applied to the modulator 33 to thereby limit the effect of the latter in opening the exhaust nozzle 13.

The exhaust nozzle feedback in general has a provision enabling a speed signal of given positive value to restrict the nozzle 13 more rapidly than a signal of equal negative value opens it. Accordingly, a rectifier CR–123a conducts from ground through the resistance R174 to the parallel branch 120 between the resistances R145 and R173, the purpose of the latter rectifier CR–123a being to conduct from ground to limit the neutralizing effect of a given voltage change from the potentiometer slider 117 in a decreasing direction.

*Temperature sensitive network*

The temperature network 29 is coupled to the positive and negative terminals M and N of thermocouple 26 (Fig. 4a). Positive terminal M is connected to an arm 85 vibrated by changing magnetism of the winding 86 connected between phase "A" and "B." The vibrating arm 85 engages opposed contact terminals 87 and 88 connected to ends "1" and "2" of primary 89 of the transformer T–101 to provide a mechanical chopper for the thermocouple direct current.

A temperature reference voltage is supplied by the line 90 through a temperature adjusting resistance R104 and the resistance R105, to the terminal 91 of a voltage dividing network, which has a terminal 92 connected by conductor 93 to the midpoint "7" of the transformer primary 89. The voltage dividing network may include series connected resistances R160 and R162 and series resistances R163 and R103 which are connected in parallel between terminal 91 and the grounded thermocouple negative terminal N. The resistance R160 has a negative resistance-temperature coefficient to compensate for the effects of ambient temperature variations in the cold junction N of the thermocouple 26. In the practice of my invention, the resistor R160 is mounted physically near to the cold junction N so that they are both substantially of the same ambient temperature. The components of said voltage dividing network are so chosen that the generated voltage output thereof is equal in magnitude to that of the thermocouple at a preselected temperature. The latter temperature may be chosen to correspond to the maximum safe-operational temperature of the turbine blade material.

When the voltage at 92 is greater than that at M, the input to the temperature amplifier network 29 is negative and the output of the latter is negative. Upon engagement of the arm 85 with the upper contact 87, current flows from the midpoint "7" to the upper end "1" of the primary, through the contact 87 and the arm 85 to the thermocouple terminal M, whereby the upper end "1" of the primary and the upper end "5" of the secondary 95 of the transformer have negative polarity. Likewise, upon engagement of the arm 85 with the contact 88, the lower ends "2" and "6" of the primary and secondary transformer windings have negative polarity.

The transformer T–101 supplies the two stage vacuum tube amplifier 96, whose output plate circuit includes the primary 97 of the input transformer T–102 of the phase-sensitive detector 98. The secondary 100 of the transformer T–102 has its midpoint "7" connected through the secondary 101 of transformer T–103 and rectifiers CR–101a and CR–101b to the upper and lower ends "5" and "6" of the secondary of the transformer T–102, the rectifiers being conductive toward the latter transformer ends. The primary 102 of the transformer T–103 has its ends "1" and "2" connected to phases "B" and "A." The secondary voltage of T–103 should be higher than the maximum voltage derivable either at the terminals "5" and "7" or "6" and "7" of secondary 100 of T–102. If the portion of the secondary winding of transformer T–102 between "5" and "7" is in phase with the secondary 101 of the transformer T–103, the output of the amplifier is negative. That is, during the half periods when points "4" and "7" are positive and points "5" negative the upper condenser of detector 98 is charged to a negative potential with its upper plate negative and lower positive which is higher than the potential to which the lower condenser is charged. On the other hand, should the thermocouple voltage become higher than the reference, then "6"—"7" of the transformer T–103 and the amplifier would give positive output. That is the lower condenser of detector 98 would be charged to a higher negative potential, with its lower plate negative and upper positive than the upper condenser.

The output of the detector 98, after passing through the filter including the choke L–101 and the condensers C107 and C108, is supplied to the terminal 103 joined to the feedback connection 104 including the resistance R112 and connected to midpoint "7" of transformer T–101 and the terminal 103 is also connected, through resistance R110, to steady-state temperature line 32.

The terminal 103 is connected through the steady-state temperature control line 32 including the resistor R110 and the resistor R119 to the terminal 53a of the fuel valve modulator 34.

The steady-state temperature control line 32 is supplied by the temperature setting line 106 (Fig. 4b) through the resistance R116 from the slider 18b of the temperature setting 18 and it has a branch 32a including the resistance R171 and connected to the branch 52 of the exhaust nozzle modulator 33 between the rectifiers thereof. The branch 32a provides for closing of the exhaust nozzle with very little over-speed of the engine. Without this connection, excessive over-speeding would be required for a sufficient positive closing speed signal.

Voltage limiters are associated with the steady-state temperature control line 32 to limit the voltage applied thereby to the modulators. To this end, the steady-state control line 32 is connected, through rectifiers CR–102a and CR–102b to regions 107 and 108 whose potentials are slightly higher and slightly lower than zero so that the extent to which the steady-state line 32 may become positive is limited by the potential of the region 107 to which the rectifier CR–102a is conductive from the line 32 and the extent to which the line 32 may become negative is limited by the potential of the region 108 from which the rectifier CR–102b is conductive to the line 32. The higher and lower potential sources may be positive and negative terminals 109 and 110 of a battery having an intermediate point 111 grounded, as shown in Fig. 5, or the terminal 109a may be provided by a point on the plate circuit of the tubes of the amplifier 44, separated by the resistance R115 from ground and the terminal 110a (Fig. 4a) may be constituted by a point on the branch 75 of the reference component between the resistances R139 and R140. Increase in voltage of the line 32 is limited by the voltage of region 107, any tendency of increase in line voltage above that of such region resulting in flow of current from the line through the rectifier 102a to the region. On the other hand, the extent to which the steady-state line may be decreased in voltage, or go negative, is limited by the potential of the region 108, decrease in line voltage below that of such region resulting in flow of current from the latter to the line.

*Fuel valve modulators*

The fuel input control modulator 34 is similar in operation to the exhaust nozzle area control modulator 33. It includes a transformer T–104 having ends "2" and "1" of its primary 49a connected to phases "C" and "B," and having the ends "5" and "3" of its secondary 50a connected by branches 51a and 52a, which, respectively, include a pair of rectifiers CR–104a and CR–104b. The rectifiers CR–104a are conductive from "5" to "3" and the rectifiers CR–104b are conductive from "3" to "5." The midpoint of secondary 50a is tapped at "4" to ground. Between the rectifiers CR–104a, the modulator has a terminal 53a connected to the grid 57 of the initial vacuum tube 58 of the alternating current amplifier, at 44. In addition to connection of speed signal branch 31a and of the temperature signal line 32 to the terminal 53a, the latter also has temperature limit and fuel input feedback connections, as will be subsequently described.

*Fuel valve amplifier and control apparatus*

The fuel valve amplifier 44 is similar to the exhaust nozzle amplifier 36, and it has the plate circuit 138 of its final stage including the transformer primary 139 of the input transformer T–105 for the phase-sensing power amplifier 45.

The secondary 140 of the transformer T–105 has its upper end "6" connected to the midpoint "4" of the secondary 141 of the transformer T–106, whose primary 142 has its ends "2" and "1" connected to phases "A" and "C." The lower end "5" of the transformer secondary 140 is connected to ground. The ends "3" and "5" of the transformer secondary 141, corresponding to the ends "2" and "1" of the primary 142, are connected, through resistances R131 and R132, to grids 145 and 146 of the thyratrons 147 and 148. The latter thyratrons have their plates 149 and 150 connected to the outer ends "6" and "3" of the secondaries 151 and 152 of the transformer T-107, which has a primary 153 whose ends "2" and "1" are connected to the phases "B" and "C." The adjacent ends "5" and "4" of the transformer secondaries 151 and 152 are connected, through condensers C136 and C135, to the ends "6" and "3" and are connected through the conductors 154 and 155 to the cathodes of the tubes 148 and 147, respectively, and through resistances R133 and R134 to ground. The conductors 154 and 155 provide supply leads 156 and 157 for the motor 16.

Since the primary 142 of transformer T-106 is connected across phases AC and the primary 153 of transformer T-107 across phases BC, the potential derived from transformer T-106 is displaced in phase by 120° with respect to the potential derived from T-107. The secondaries of these transformers are so connected that their potentials impressed on the grids of the two thyratron potentials lag the anode potentials of the thyratron by 120°. That is, in the absence of potential on transformer T-105 the thyratrons 147 and 148 are fired late in the half periods of the supply "C"—"A." With the plates 149 and 150 of the thyratrons 147 and 148 rendered alternately positive by the transformer T-107, if, with a plate positive, the corresponding grid voltage becomes sufficiently positive to start conduction of one of these tubes, that tube will remain conductive independently of grid voltage until the plate voltage becomes negative in accordance with conventional thyratron operation. In the arrangement shown, if the fuel valve modulator signal is negative, then the alternating current wave applied by the amplifier 44 causes the upper end "6" of the secondary of the transformer T-105 to be positive when the plate 150 is positive, and, just as soon as the potential applied to the grid 146 is sufficient to start conduction, the tube becomes conductive and remains so until its plate becomes negative at the beginning of the next half cycle, at which time the plate 149 of the tube 147 becomes positive. But, as the end "6" of transformer T-105 then had negative polarity, the amplitude of the wave applied to the grid 145 is reduced, in consequence of which the starting voltage occurs later in the cycle and the conduction period of the tube is thereby shortened. If the modulator signal is positive, the contrary operation takes place, and the terminal "6" of transformer T-105 then is positive when the plate 149 is positive. The signals derivable from transformer T-105 is superimposed on the voltage derived from transformer T-106 and, depending on their polarity, shift the phase of the net voltage impressed on the grids of one thyratron forward and the other backward. One thyratron is thus fired earlier in the half periods and the other later, depending on the polarity of the voltage derived from transformer T-105.

Assuming no signal current is applied to the fuel valve modulator 34, then, as the plates of the thyratrons 147 and 148 are made alternately positive in 120-degree phase relation with respect to the grids thereof, the tubes will be alternately energized. As line 156 is positive relative to line 157 to drive the motor in the direction for increased fuel input when the tube 147 is energized, and as line 157 is positive relative to line 156 to drive the motor in the opposite direction to decrease the fuel input, it will be apparent that, so long as there is no signal applied to the fuel valve modulator 34, the motor 16 will be energized alternately for operation in opposite directions to equal extents with the result that no material movement thereof occurs. If a negative signal is applied to the fuel valve modulator 34, then the terminal "6" of transformer T-105 will be in phase with the plate 150 when the latter is positive and the voltage of the transformer T-105 will add to that of transformer T-106 to phase of the wave applied to the grid 146 forward with reference to the corresponding anode wave. On the succeeding half cycle, the plate 149 will be positive, but the excitation of the grid 145 will be reduced by the transformer T-105. Therefore, the periods of motor energization for increase in fuel preponderate over those for decrease therein, the magnitude of preponderance depending upon the magnitude of the signal and the direction of rotation of the motor depending upon the signal polarity.

*Fuel valve feedback*

Respecting the fuel input feedback, as the fuel is increased, the potentiometer 121 is operated, and the slider 122 is moved along a resistance 122a in a direction to increase the potential applied to the feedback line 123 connected through parallel branches 124 and 125 to the modulator terminal 53a. The branch 124 includes the condenser C141 followed by the resistance R121, and the branch 125 includes the condenser C110 preceded by the resistance R120. The follow-up signal applied by the branch 124 is stabilized by that applied through the branch 125. The slider voltage applied through the parallel-connected condensers and resistances tends to neutralize the resulting signal applied to the modulator terminal 53a.

The feedback line 123 (Fig. 5) also has a branch 126 including the condenser C111 and the resistance R167. This branch is connected to the section 127 of the temperature limit line 128, such section being connected through the resistance R168 to the temperature network terminal 103 and through the rectifier CR-103a to the section 129. The latter section 129 is connected through the resistance R118 to the modulator terminal 53a. If the section 129 of the temperature limit line tends to become negative in relation to ground (by reason of back resistance of rectifier CR-103a), then conduction from ground occurs through the rectifier CR-103b thereto and action of modulator 34 is prevented.

As long as a steady-state condition obtains, then no feedback voltage is applied through the branch 126 to the temperature limit line section 127; however, positive change of feedback voltage relative to ground has the effect of neutralizing the negative temperature signal supplied to section 127, in consequence of which the modulator input is rapidly neutralized and movement of the fuel valve in an opening direction is limited. If the potential supplied through resistor R168 is zero then positive potential supplied through 126 will tend to close the fuel valve. Thus, the feedback operates in a manner anticipatory of temperature by restricting the fuel input to avoid excessive rise in temperature. On the other hand, if the section 129 of the temperature limit line tends to become negative in relation to ground, then conduction from ground thereto occurs through the rectifier CR-103b. The main effect of the feedback of the fuel valve movement signal is to over-ride the temperature input signal at low speeds to thereby aid in acceleration, by avoiding excessive opening of the fuel valve.

*Speed signal crossfeed*

Negative polarity of the speed signal applied to the fuel valve modulator 34 is limited by the rectifier CR-102c which is conductive from a suitable negative source to the speed line branch 31a including the resistance R143 and connected through the resistance R117 to the terminal 53a of the fuel valve modulator 34. It is the negative signal impressed on modulator 34 which causes the fuel valve 16 to open. Thus not only is a check placed on temperature and speed signals to make the fuel valve modulators 34 respond to steady-state values of such signals, but, by limiting the negative speed signal for fuel valve operation, a required change in fuel input may be more gradually made to suit operating requirements and to avoid over-temperatures. In addition to application of the speed signal by the line 31a to the modulator 34, to hasten speed response of the latter, a derivative or rate of change of such signal may be applied by the rate line 31b including the series connected resistance R172, rectifier CR–123 and condenser C125.

Temperature signal crossfeed

The temperature signal line branch 32a is connected to the branch 52 of the exhaust nozzle modulator 33 between the rectifiers CR–112b, whereby the alternating current output of said modulator for a temperature signal will be out of phase 180 degrees relative to such output for a speed signal of like polarity. Therefore, the phase-sensitive amplifier 37 is responsive to a negative speed signal to operate the servo 14 to open the exhaust nozzle and is responsive to a negative temperature signal to operate a servo 14 to restrict the exhaust nozzle. The magnitude of these signals of both polarities is limited by the rectifier system including the rectifiers CR–102a and CR–102b and, therefore, the rate at which the nozzle 13 opens or closes is limited. A condenser C152 preferably connects the branches 51 and 52 between the rectifiers of the modulator 33. A function of condenser C152 is to couple the output of the ring modulator branch CR–112b to the control grid 55 of amplifier tube 56 of the exhaust nozzle actuator circuit. In addition to the modulator terminal 53 being connected to the speed signal line 31 and to the grid 55, such terminal is also connected to the exhaust nozzle feedback, as was previously described.

System as a whole

In Fig. 5 is shown a simplified block diagram showing some of the major control components of the control system in block diagram. The frequency meter 28 is shown as a block diagram having its output fed through line 31 to the exhaust nozzle modulator 33 which is also shown as a block. The D. C. speed signal output from the frequency meter which passes along line 31 is fed to fuel valve modulator 34 along speed signal cross fed connections 31a and 31b. The thermocouple amplifier 29, shown as a block, amplifies the very low D. C. voltage output of the thermocouple 26 to give a D. C. temperature signal output which is also fed to modulator 34. The temperature signal crossfed connection 32a from the thermocouple amplifier 29 to the exhaust nozzle modulator 33 is shown. The relatively direct line relationship between modulator 33, exhaust nozzle amplifier 36, and phase sensing power amplifier 37 to control the exhaust nozzle servo 14 is shown. The relatively direct line relationship between modulator 34, fuel valve amplifier 44 and phase sensing power amplifier 45 to control the fuel valve motor 16 is also shown. The exhaust nozzle feedback network 116 is shown coupled through line 118 back through a variable resistance circuit to be fed into the input of modulator 33. The fuel valve feedback circuit comprising potentiometer 121 connected through lead 123 back to the input of modulator 34 is shown. The pilot's manual lever 19 which changes the resistance of potentiometers 18a and 17a to introduce speed and temperature change voltage components is shown. The various limiting circuits and variable resistance networks are shown in their proper circuit relationship.

Exhaust nozzle servomotor

As shown more particularly in Fig. 6, the exhaust nozzle hydraulic servomotor 14 includes an operating piston 160 in the cylinder 161 having opposite ends connected by passages 162a and 162b to the chambers 163a and 163b. A relay 164 has end pistons 165a and 165b separating inner cylinder spaces 166a and 166b from outer cylinder spaces 167a and 167b. The inner cylinder spaces 166a and 166b are connected by a passage 168 in which a substantially constant pressure (for example, 150 p. s. i.) is maintained and the outer cylinder spaces 167a and 167b are connected to passages 169a and 169b connected by orifices 171a and 171b to the passage 168.

A substantially constant flow of oil (for example, 2.5 G. P. M.) is supplied from the passage 172 through inner openings 173a and 173b to the chambers 163a and 163b, and from the latter through the outer openings 174a and 174b to the inner cylinder spaces 166a and 166b and thence to the low-pressure passage 168.

The relay includes plug valves 175a and 175b in the chambers 163a and 163b and cooperating with the inner openings 173a and 173b to provide inner orifices 176a and 176b and cooperating with the outer openings 174a and 174b to provide outer orifices 177a and 177b.

The teeter valves 41 and 40 control discharge from the passages 169a and 169b for the outer cylinder spaces 167a and 167b. Assuming differential energization of the magnet windings 38 and 39 to restrict the discharge from one teeter valve and increase that from the other, a differential pressure will thereby be created in the outer cylinder spaces 167a and 167b, in consequence of which the relay 164 will be moved.

Assuming the relay, at 164, to move to the left in consequence of higher pressure in the right cylinder space 167a, the right inner and the left outer orifices 176a and 177b will be restricted in flow area while the right outer and the left inner orifices 177a and 176b will be increased in flow area, with the result that the pressure in the right chamber 163a will be reduced while that in the left chamber 163b will be increased and the differential pressure thereby created is effective to move the operating piston 160 to the right. On the other hand, if the relay is moved to the right, the contrary operation takes place, the operating piston 160 being moved to the left.

As shown, the piston 160 has a rod 180 mechanically connected to the "eyelids," or movable members 13, defining the exhaust nozzle area. Rearward motion of the rod increases the nozzle area and vice versa. As shown in Figs. 1 and 4c, the rod 180 is pivotally connected to a curved rocker 181 carried by the housing and connected by links 182 to the eyelid members 13 pivotally connected to the housing at 183.

Because of the larger radii of the inner orifices 176a and 176b relative to the outer orifices 177a and 177b, the pressures in the chambers 163a and 163b apply opposed inward forces to the plugs 175a and 175b and the liquid under high pressure supplied by the pipe 172 applies opposed outward forces to such plugs, the outward forces being relatively larger than the inward forces. With the pressures in the teeter valve spaces 167a and 167b the same, the forces thereof applied to the relay pistons 165a and 165b balance and the right-hand forces applied to the plugs balance the left-hand forces applied to the latter.

Assuming that, due to teeter valve operation, the pressure in right-hand space 167a is increased and that in the left-hand space 167b is decreased, a left-hand force is thereby applied to the relay to move it to the left; however, as the relay moves to the left, the pressure drop across the orifice 176a increases while that across the orifice 176b decreases, in consequence of which the pressure in the chamber 163a decreases and that in the chamber 163b increases, giving a resultant right-hand force which increases to balance the left-hand force due to teeter valve operation. Therefore, the extent of relay movement depends upon teeter valve movement and the relay will apply chamber differential pressure to move the operating piston as long as the teeter valves are not in equilibrium.

Upon deenergization of the energized solenoid 38 or 39, the balanced relation of pressure in the teeter valve spaces 167a and 167b is restored, the necessary flow therefor occurring through the orifices 171a and 171b, and the teeter valves assuming an equilibrium position. With the right-hand forces applied to the plugs larger than the left-hand forces applied thereto to give a differential balancing the differential applied to the pistons 165a and 165b, as the pressures in the spaces 167a and 167b are restored to equilibrium, the unbalanced differential applied to the plugs is effective to move the relay to a position where the right-hand and left-hand forces applied to the plugs balance.

The floating type servo, at 14, provides the power required to adjust the exhaust nozzle area in accordance with signal inputs to the modulator, at 33; and, as the servo is motivated hydraulically under control of the output of the phase-sensitive amplifier, at 37, the power requirements of the latter are relatively small. On the other hand, as the power required to move the fuel valve 15 is comparatively small, such movement may be effected by an electric motor 16 energized by the electronic output of the amplifier 45.

Fig. 7 has been described above with respect to the modulator 34 and shows the output modulated wave form. In Fig. 11 this operation is shown more in detail.

Modified frequency meter

In Fig. 8 is shown a modified circuit for use as the frequency meter network 28. In lieu of the rectifiers CR–109 and CR–115, as shown in Fig. 4a, two vacuum tube diode rectifiers 210 and 212 may be employed; and, instead of the selenium rectifier elements CR–110 and CR–111 shown in Fig. 4a, there may be substituted two vacuum tube diodes 214 and 216. The remaining circuit of the frequency network 28 remains basically the same as that shown in Fig. 4a. Condenser C154 which has been chosen to compensate for the temperature effects on the valves of the various other components has been substituted for previous condensers C120 and C130. This condenser has a negative capacity temperature coefficient. The substitution of the vacuum tube diode rectifiers under certain conditions of operation may be more suitable in view of the effect of high temperatures upon the characteristics of certain types of rectifier elements, such as selenium rectifier elements.

Modified temperature amplifier

In Fig. 9 is shown a modified circuit for use in place of the temperature amplifier circuit 29 shown in Fig. 4a. Instead of the selenium rectifier elements CR–101a and CR–101b with the associated circuitry as shown in Fig. 4a, a second mechanical vibrator chopper element 220, the vibrating member of which is operated by the same coil 86 as the vibrating member 85 shown in Fig. 4a, may be substituted to accomplish the reconversion of the amplified A. C. signal output of amplifier 96 to an amplified D. C. signal. The chopper 220 being operated in synchronism with the chopper 85 functions effectively as a commutator in the secondary circuit of transformer T–102. The amplified temperature signal thus converted to D. C. by the same stroke which converts the input signal to A. C. is the output D. C. signal which is fed into the rest of the control circuits (lines 32, 129, 126). This arrangement is more satisfactory under certain operational conditions than is the system shown in Fig. 4a, as it may eliminate complicated circuitry and improve the rectification characteristics of the signal reconversion.

The components of Fig. 9 which correspond in function to those of Fig. 4a have been given duplicate reference numerals. The secondary 100 of transformer T–102 in the modified circuit conducts current only during alternate half-cycles of the amplified alternating current from the amplifier 96. The vibrating member 220 is alternately grounded to accomplish this half-wave rectification of the amplifier 96 output wave. The system operation subsequent to terminal 103 is generally the same as previously described with regard to Fig. 4a.

Operation of frequency meter

In Fig. 10 are shown the current curves, plotted with frequency F as the abscissa and the current divided by the impressed signal voltage, $$\frac{I}{E_0}$$

as the ordinate, for the two branch networks 60 and 61 of the frequency meter 28. The curve 200 of the current output of the frequency responsive rectifier branch 61 is substantially linear over the frequency range of operation of the engine, since the current derived from branch 60 varies directly with frequency. The current of branch 61 varies directly with frequency over a short range at low frequencies and beyond this change is substantially constant. This current is represented by curve 201. Accordingly, the current of branch 60 may be expressed as a function of frequency by the equation $$\frac{I}{E_0}=RF$$

and, beyond the low frequency range where the current of branch 61 varies, this latter may be expressed by the equation $$\frac{I}{E_0}=K$$

At a frequency $F_0$, the two currents are equal. At this frequency $$kF_0=K$$

That is, $F_0$ is a constant independent of the voltage $E_0$. The summation current represented by curve 202 is balanced against the current received over line 84 (in Fig. 4b) from the manual speed setting 17. When the latter currents are balanced, the speed signal sent to the modulators over line 31 is zero to bring about no change in the engine operation.

The frequency $F_0$ corresponds to the condition of operation at which the currents through branches 60 and 61 are balanced against each other. This frequency arises in actual operation only if the current from potentiometer 17 is zero, that is, at the highest engine speed (military speed). At other speeds of the engine the actual frequency is less than $F_0$. At these latter speeds the current from the potentiometer 17 is balanced against the net current from the frequency meter; that is the different current between the current of curve 200 and the current of curve 201 is balanced against the current from potentiometer 17. It is essential that the frequency $F_0$ be maintained constant independent of temperature variations. It is for this reason that I have provided the temperature compensating condenser C150. This condenser is so selected as to compensate for the variations with temperature of all of the components of the meter.

In Fig. 11 are shown the operational curves of the modulators 33 or 34 to show the manner in which the direct-current speed and temperature signals, when applied to said modulators, are chopped thereby into a modulated alternating-current output voltage. Curve 240 of Fig. 11 shows the unmodulated alternating-current voltage wave which is applied to the primaries 49 and 49a of transformers T–108 and T–104, respectively. The curve 242 has been chosen to merely illustrate an operational direct-current voltage wave form of the combined direct-current temperature and speed signal input to either of the modulator circuits, where the combined direct-current signal hypothetically varies from a negative to a positive value. As the modulator 33 or 34 functions to modulate the alternating-current voltage wave 240 by the direct-current voltage wave 242 the output wave form of the modulator is shown as curve 244. The modulators operate as electrical switches to alternately ground the direct-current signal shown in curve 242 during one-half of the alternating-current voltage wave 240 cycle, and to conduct the direct-current voltage shown by curve 242 during the other half cycle of said alternating-current voltage wave 240, as shown in curve 244.

It will be seen from curve 244 that the alternating-current output with respect to ground will have a magnitude which is proportional to the amplitude of the direct-current input signal 242 and which will reverse phase when the direct-current input signal 242 passes through a zero value.

*Operation*

The foregoing apparatus operates as follows: The operator moves the throttle lever 19 to adjust the regulator to cause operation of the latter to vary the thrust of the engine. The regulator controls the exhaust nozzle area in response to magnitude and polarity of speed and temperature signals applied to the modulator 33, and it controls the fuel valve in response to the magnitude and polarity of the algebraic sum of speed and temperature signals applied to the modulator 34. Each modulator 33 or 34 operates to provide an alternating-current output wave 244 whose amplitude depends upon the magnitude of a speed and temperature direct-current signal input wave 242, with the wave 244 for a negative signal out of phase by 180 degrees with respect to that for a positive signal. The alternating current output of each modulator is amplified and furnished to a phase-sensitive amplifier supplying the corresponding servo, the arrangement being such that negative speed signals cause increase in nozzle area and in fuel input and vice versa and negative temperature signals cause decrease in nozzle area and increase in fuel input and vice versa.

The direct current speed and temperature signal inputs are provided by means responsive to engine speed and temperature and by manually-controlled adjustments. The speed signal, by means of the manually-movable setting 17, is made to give a negative speed signal effective on the modulator 33 to cause opening of the exhaust nozzle and effective on the modulator 34 to increase the fuel input.

Temperature-responsive means 29 operates to provide an output, normally negative, and which, with positive and negative limits, provides a steady-state temperature signal which is made negative by throttle adjustment for increase in speed. The steady-state temperature signal so provided and modified is applied to both modulators 33 and 34. It is applied to the exhaust nozzle modulator 33 in such a manner that the alternating current wave caused thereby is 180 degrees out of phase with respect to the wave caused by a speed signal of like polarity, with the result that a negative temperature signal tends to close the exhaust nozzle and open the fuel valve.

The means by which a speed signal is applied to the fuel valve modulator 34 has means limiting the extent of negative polarity of such signal to limit the increase in the fuel input thereby.

In addition to the speed and temperature signal inputs for the modulator 33, the latter is also supplied with neutralizing or follow-up inputs dependent upon exhaust nozzle position. Therefore, if a negative combination speed and temperature signal is applied to the modulator to bring about opening of the exhaust nozzle, such opening results in the application of an increase in positive feedback signal to the modulator to neutralize the negative combination signal, whereupon movement of the exhaust nozzle ceases. This follow-up or feedback connection includes means whereby a smaller combination signal is required for closing the exhaust nozzle than for opening it, so the nozzle may be closed more rapidly than it is opened.

In addition to the limited speed signal and the steady-state temperature signal applied to the fuel valve modulator 34, there are temperature limit and fuel valve feedback or follow-up signals. Assuming a negative input signal to be applied to the fuel valve modulator 34, then, as the fuel valve opens, an increase in positive signal is fed back to neutralize the negative input signal to stop further opening of the fuel valve.

A temperature limit signal is applied to the modulator to avoid excessive fuel input, particularly when the engine is accelerating. To this end, there is provided the temperature limit line 128, including first and second sections 127 and 129 connected by a rectifier CR–103a which is conductive from the first section 127 to the second section 129. The first section is connected to the outlet terminal of the thermocouple amplifier 29 through a resistance R168 and the second section 129 is connected through a resistance R118 to the modulator 34. Normally, the potential of the first section 127 is negative, and the second section 129 is kept from going negative by a rectifier CR–103b which is conductive from ground thereto. The resistance R118 connecting the second section 129 to the modulator 34 assures, not only of a signal applied to the latter which is normally negative relative to the second section 129 at ground potential, but it serves to limit the extent to which the terminal 53a of the modulator 34 may go negative. As long as no direct current is fed back from the fuel valve to the first section 127, there is no effect on the steady-state operation; however, just as soon as the feedback is sufficient to make the first section 127 positive relative to ground, the negative signal causing opening of the fuel valve and consequent rise in engine temperature are limited.

Since the setting voltages are obtained from rectifiers supplied from the alternator, such voltages are lowered for increase in speed and temperature, with the result that the closest regulation is secured at top speed and temperature.

While I have shown my invention in several forms, it will be obvious to those skilled in the art that it is not so limited; but is susceptible of various other changes and modifications without departing from the spirit thereof, and I desire, therefore that only such limitations shall be placed thereupon as are specifically set forth in the appended claims.

I claim as my invention:

1. In apparatus for controlling a jet engine having a fuel valve, the combination comprising a source of alternating current voltage having a frequency proportional to the speed of said engine, a speed sensitive network operable in response to said source of alternating current voltage for generating a direct current speed signal corresponding to the speed of said engine, a modulation network adapted to modulate a suitable alternating current voltage in response to said direct current speed signal, and means responsive to the output of said network for controlling the operation of said fuel valve.

2. In apparatus for controlling a jet engine having a variable exhaust nozzle discharge area, the combination comprising a source of alternating current voltage having a frequency proportional to the speed of said engine, a speed sensitive network operable in response to said source of alternating current voltage for generating a direct current speed signal corresponding to the speed of said engine, a modulation network for modulating a suitable alternating current voltage in response to said direct current speed signal, and means responsive to the output of said network for controlling the operation of said variable exhaust nozzle discharge area.

3. In a jet engine control apparatus for controlling a jet engine having a variable exhaust nozzle discharge area and a fuel valve, the combination comprising a speed sensitive network for generating a direct current speed signal which corresponds to the operational speed of said engine, a temperature sensitive network for generating a direct current temperature signal corresponding to the operational temperature of said engine, a first modulation network for generating a first alternating current signal in response to said direct current speed signal and used to control the operation of said variable exhaust nozzle discharge area, and a second modulation network for generating a second alternating current signal in response to said direct current temperature signal for use in controlling the operation of said fuel valve.

4. In control apparatus for a jet engine having a variable exhaust discharge area and a fuel valve, the combination comprising a speed-sensitive network for generating a direct current speed signal in response to the speed of said engine, a temperature sensitive network for generating a direct current temperature signal in response to the temperature of said engine, first modulation network adapted to provide a first alternating current signal which is modulated in response to said direct current speed signal and said direct current temperature signal for controlling the operation of said variable exhaust discharge area, and a second modulation network adapted to supply a second alternating current signal which is modulated in response to said direct current speed signal and said direct current temperature signal for controlling the operation of said fuel valve.

5. In control apparatus for a jet engine having a variable exhaust nozzle discharge area and a fuel valve, the combination comprising a first network for providing a direct current speed signal corresponding to the speed of said engine, a second network adapted to provide a direct current temperature signal responsive to the temperature of said engine, a first modulator network adapted to provide a first modulated alternating current signal in response to the said direct current speed signal and direct current temperature signal, a second modulator network adapted to provide a second modulated alternating current signal in response to said direct current speed signal and direct current temperature signal, a mechanism for varying the area of the exhaust discharge nozzle in response to said first modulated alternating current signal, and a second mechanism for controlling the operation of said fuel valve in response to said second modulated alternating current signal.

6. In a jet engine provided with an exhaust nozzle and a fuel valve, the combination of means for developing a voltage responsive to engine speed; means for developing a voltage responsive to engine temperature; speed and temperature settings operable manually to provide variable speed and temperature setting voltages; means responsive to the voltage difference of the speed voltage and the speed setting voltage to provide a speed signal whose polarity is negative as long as the setting voltage is less and vice versa; means responsive to the voltage difference of the temperature voltage and the temperature setting voltage to provide a temperature signal whose polarity is negative as long as the temperature setting voltage is less and vice versa; means responsive to a negative speed signal to open the exhaust nozzle and the fuel valve and vice versa and responsive to a negative temperature signal to close the nozzle and open the fuel valve and vice versa; and feedbacks responsive respectively to exhaust nozzle and fuel valve movements to neutralize the speed and temperature signals.

7. In a jet engine provided with a fuel valve having a member movable to vary the fuel input and an exhaust nozzle having a component movable to vary the nozzle area, the combination of, servomotors for moving the exhaust nozzle movable component and the fuel valve movable member; an alternator driven by the engine; means supplied by the alternator and providing voltages dependent upon engine speed and temperature; means movable to provide variable speed and temperature setting voltages; means responsive to the speed and temperature voltages and to variable setting voltages to provide speed and temperature signals each of negative or positive polarity depending upon the direction of setting voltage change; exhaust nozzle and fuel valve alternating current electronic amplifiers having input control grids; means responsive to the speed and temperature signals for energizing, at alternator frequency, the input grids of the amplifiers so that negative and positive speed and temperature signals energize the exhaust nozzle and fuel valve amplifier input grids, respectively, in 180-degree phase relation and so that a temperature signal energizes the exhaust nozzle amplifier grid in 180-degree phase relation with respect to energization thereof in response to a speed signal of the same polarity; and phase-sensitive amplifiers supplied by the respective alternating current amplifiers for controlling the servo-motors so that a negative speed signal tends to operate the exhaust nozzle servo-motor for increase in nozzle area and the fuel valve servo-motor for increase in fuel input and vice versa and so that a negative temperature signal operates the servo-motors for reduction in exhaust nozzle area and increase in fuel input and vice versa; and a member movable manually to move said movable means to vary the setting voltages for operation of the servo-motors to move the exhaust nozzle movable component and the fuel valve movable member to change the jet thrust.

8. In a jet engine provided with a fuel valve having a member movable to vary the fuel input and an exhaust nozzle having a component movable to vary the nozzle area, the combination of, servo-motors for moving the exhaust nozzle movable component and the fuel valve movable member; an alternator driven by the engine; means supplied by the alternator and providing voltages dependent upon engine speed and temperature; means movable to provide variable setting speed and temperature voltages; means responsive to the speed and temperature voltages and to the variable setting voltages to provide speed and temperature signals each of negative or positive polarity depending upon the direction of setting voltage change; exhaust nozzle and fuel valve alternating current electronic amplifiers having input control grids; means responsive to the speed and temperature signals for energizing, at alternator frequency, the input grids of the amplifiers so that negative and positive speed and temperature signals energize the exhaust nozzle and fuel valve amplifier input grids, respectively, in 180-degree phase relation and so that a temperature signal energizes the exhaust nozzle amplifier grid in 180-degree phase relation with respect to energization thereof in response to a speed signal of the same polarity; and phase-sensitive amplifiers supplied by the respective alternating current amplifiers for controlling the servo-motors so that a negative speed signal tends to operate the exhaust nozzle servo-motor for increase in nozzle area and the fuel valve servo-motor for increase in fuel input and vice versa and so that a negative temperature signal operates the servo-motors for reduction in exhaust nozzle area and increase in fuel input and vice versa; a member movable manually to move said movable means to vary the setting voltages for operation of the servo-motors to move the exhaust nozzle movable component and the fuel valve movable member to change the jet thrust; an electrical feedback responsive to movement of the exhaust nozzle movable component to neutralize energization of the exhaust nozzle amplifier grid; and an electrical feedback responsive to movement of the fuel valve member to neutralize energization of the fuel valve amplifier grid.

9. In a jet engine provided with a fuel valve having a member movable to vary the fuel input and an exhaust nozzle having a component movable to vary the nozzle area, the combination of, servo-motors for moving the exhaust nozzle movable component and the fuel valve movable member; an alternator driven by the engine; means supplied by the alternator and providing voltages dependent upon engine speed and temperature; means movable to provide variable setting speed and temperature voltages; means responsive to the speed and temperature voltages and to variable setting voltages to provide speed and temperature signals each of negative or positive polarity depending upon the direction of setting voltage change; exhaust nozzle and fuel valve alternating current electronic amplifiers having input control grids; means responsive to the speed and temperature signals for energizing, at alternator frequency, the input grids of the amplifiers so that negative and positive speed and temperature signals energize the exhaust nozzle and fuel valve amplifier input grids, respectively, in 180-degree phase relation and so that a temperature signal energizes the exhaust nozzle amplifier grid in 180-degree phase relation with respect to energization thereof in response to a speed signal of the same polarity; and phase-sensitive amplifiers supplied by the respective alternating current amplifiers for controlling the servo-motors so that a negative speed signal tends to operate the exhaust nozzle servo-motor for increase in nozzle area and the fuel valve servo-motor for increase in fuel input and vice versa and so that a negative temperature signal operates the servo-motors for reduction in exhaust nozzle area and increase in fuel input and vice versa; a member movable manually to move said movable means to vary the setting voltages for operation of the servo-motors to move the exhaust nozzle movable component and the fuel valve movable member to change the jet thrust; an electrical feedback responsive to movement of the exhaust nozzle movable component to neutralize energization of the exhaust nozzle amplifier grid; and including means providing for greater movement of the component in a closing than in an opening direction to effect neutralization; and an electrical feedback responsive to movement of the fuel valve member to neutralize energization of the fuel valve amplifier grid.

10. A combustion engine having a fuel valve with a movable control member to vary the fuel input and a valve having a controllable member to vary the outlet pressure from said engine; a first manual means for setting a first parameter to determine the speed of said engine; a second manual means for setting a second parameter to determine the temperature of a region of said engine, which is temperature sensitive to both the fuel flow and the outlet pressure; means for deriving from said engine a third parameter dependent in magnitude on said engine speed; means for deriving from said engine a fourth parameter dependent on said temperature of said temperature-responsive region; means for balancing said first and third parameters to produce a first resultant parameter; means for balancing said second and fourth parameters to produce a second resultant parameter; means cooperative with said means for balancing said first and third parameters for deriving a first pulsating potential dependent in phase upon the polarity of said first resultant parameter; means cooperative with said means for balancing said second and fourth parameters for deriving a second pulsating potential dependent in phase on said second resultant parameter; means responsive to said first pulsating potential for adjusting said outlet pressure; and means responsive to said second pulsating potential for adjusting the setting of said movable control member.

11. In a jet engine including an alternator the output of which has a frequency and a magnitude dependent on the speed of said engine and fuel supply means including a valve for controlling the flow of fuel; the combination comprising, a first network responsive to the frequency of said alternator; a second network responsive to the amplitude of the output of said alternator; manual means for producing a parameter; a comparison network for comparing the output of said frequency responsive network, the output of said speed responsive network and said parameter; and connections for controlling said valve in accordance with the output of said comparison network.

12. Apparatus according to claim 11 in which the components of the amplitude responsive network are so related that, when said manually produced parameter is suddenly varied, transients in the output of said comparison network are suppressed.

13. In a jet engine control apparatus, the combination comprising an alternator the output of which has a frequency and magnitude dependent on the speed of said engine, a frequency meter connected to the output of said alternator, said meter including a frequency responsive branch network and an amplitude responsive branch network, and a fuel valve control motor operable in response to the output of said frequency meter for controlling the flow of fuel to said engine, the components of said frequency meter branch networks respectively being selected so the voltages developed across them balance out to make said frequency meter give a zero output to operate said fuel valve control motor at the maximum safe operating speed of said engine.

14. In apparatus for controlling a jet engine having a fuel valve, the combination comprising a source of alternating current voltage having a frequency proportional to the speed of said engine, a speed sensitive network operable in response to said source of alternating current voltage for generating a direct current speed signal corresponding to the speed of said engine, a temperature sensitive network operable in response to said source of alternating current voltage for generating a direct current temperature signal corresponding to the temperature of said engine, and a modulation network adapted to modulate a suitable alternating current voltage in response to said direct current speed signal and said direct current temperature signal for controlling the operation of said fuel valve.

15. In apparatus for controlling a jet engine having a variable exhaust nozzle discharge area, the combination comprising a speed-sensitive network for generating a direct current speed signal corresponding to the speed of said engine, a temperature-sensitive network for generating a direct current temperature signal corresponding to the temperature of said engine, and a modulation network for generating an alternating current signal in response to said direct current speed signal and said direct current temperature signal for controlling the operation of said variable exhaust nozzle discharge area.

16. In a jet engine control apparatus for controlling a jet engine having a variable exhaust nozzle discharge area and a fuel valve, the combination comprising a speed-sensitive network for generating a direct current speed signal which corresponds to the operational speed of said engine, a temperature-sensitive network for generating a direct current temperature signal corresponding to the operational temperature of said engine, a first modulation network for generating a first alternating current signal in response to said direct current speed signal and said direct current temperature signal and used to control the operation of said variable exhaust nozzle discharge area, and a second modulation network for generating a second alternating current signal in response to said direct current speed signal and said direct current temperature signal for use in controlling the operation of said fuel valve.

17. In a jet engine provided with an exhaust nozzle having a variable discharge area, the combination of a source of alternating current voltage having a frequency proportional to the speed of said engine, a speed sensitive network operable in response to said source of alternating current voltage for generating a direct current speed signal corresponding to the speed of said engine, a speed setting device operable manually to provide a speed setting voltage, a network adapted to modulate a suitable alternating current voltage in response to said direct current speed signal and said speed setting voltage, and means responsive to the output of said network for controlling the operation of said exhaust nozzle.

18. In a jet engine control apparatus for controlling a jet engine having a variable exhaust nozzle discharge area and a fuel valve, the combination comprising a speed-sensitive network for generating a direct current speed signal which corresponds to the operational speed of said engine, a first modulation network for generating a first alternating current signal in response to said direct current speed signal for controlling the operation of said variable exhaust nozzle discharge area, and a second modulation network for generating a second alternating current signal in response to said direct current speed signal for controlling the operation of said fuel valve.

19. In a jet engine control apparatus for controlling a jet engine having a variable exhaust nozzle discharge area and a fuel valve, the combination comprising a temperature-sensitive network for generating a direct current temperature signal corresponding to the operational temperature of said engine, a first modulation network for generating a first alternating current signal in response to said direct current temperature signal for controlling the operation of said variable exhaust nozzle discharge area, and a second modulation network for generating a second alternating current signal in response to said direct current temperature signal for controlling the operation of said fuel valve.

20. In apparatus for controlling a jet engine having a variable exhaust nozzle discharge area and a fuel valve, the combination comprising a speed-sensitive network for generating a direct current speed signal which corresponds to the operational speed of said engine, a speed setting operable manually to provide a variable speed setting voltage, a first modulation network for generating a first alternating current signal in response to said direct current speed signal and said speed setting voltage for controlling the operation of said variable exhaust nozzle discharge area, and a second modulation network for generating a second alternating current signal in response to said direct current speed signal and said speed setting voltage for controlling the operation of said fuel valve.

21. In apparatus for controlling a jet engine having a variable exhaust nozzle discharge area and a fuel valve, the combination of a temperature-sensitive network for generating a direct current temperature signal corresponding to the operational temperature of said engine, a temperature setting operable manually to provide a temperature setting voltage, a first modulation network generating a first alternating current signal in response to said direct current temperature signal and said temperature setting voltage for controlling the operation of said variable exhaust nozzle discharge area, and a second modulation network for generating a second alternating current signal in response to said direct current temperature signal and said temperature setting voltage for controlling the operation of said fuel valve.

22. In apparatus for controlling a jet engine having a variable exhaust nozzle discharge area, the combination comprising an alternator operatively connected to said engine to have a frequency of alternation proportional to engine speed, a temperature sensitive network responsive to the output of said alternator for generating a direct current temperature signal corresponding to the operational temperature of said engine, a modulation network having an output, said modulation network being adapted to modulate the output of said alternator in response to said direct current temperature signal, a control amplifier connected to the output of said modulation network, and means responsive to the output of said amplifier for controlling the operation of said variable exhaust nozzle discharge area.

23. In apparatus for controlling a jet engine having a variable exhaust nozzle discharge area, the combination comprising a speed-sensitive network for generating a D. C. speed signal corresponding to the operational speed of said engine, a temperature-sensitive network for generating a D. C. temperature signal corresponding to the operational temperature of said engine, a modulation network having an output and being adapted for generating an A. C. signal in response to said D. C. speed signal and said D. C. temperature signal, and a control amplifier connected to the output of said modulation network for controlling the operation of said variable exhaust nozzle discharge area.

24. In a jet engine control apparatus for controlling a jet engine having a variable exhaust nozzle discharge area and a fuel valve, the combination comprising a speed-sensitive network for generating a D. C. speed signal which corresponds to the operational speed of said engine, a first modulation network having an output and being adapted for generating a first A. C. signal in response to said D. C. speed signal, a first control amplifier connected to the output of said first modulation network for controlling the operation of said variable exhaust nozzle discharge area, a second modulation network having an output and being adapted for generating a second A. C. signal in response to said D. C. speed signal, and a second control amplifier connected to the output of the second modulation network for controlling the operation of said fuel valve.

25. In apparatus for controlling a jet engine having a variable exhaust nozzle discharge area and a fuel valve, the combination comprising a temperature-sensitive network for generating a D. C. temperature signal corresponding to the operational temperature of said engine, a first modulation network having an output and being adapted for generating a first A. C. signal in response to said D. C. temperature signal, a first control amplifier connected to the output of the first modulation network for controlling the operation of said variable exhaust nozzle discharge area, a second modulation network having an output and being adapted for generating a second A. C. signal in response to said D. C. temperature signal, and a second control amplifier connected to the output of the second modulation network for controlling the operation of said fuel valve.

26. In apparatus for controlling a jet engine having a variable exhaust nozzle discharge area, the combination comprising a source of alternating current voltage having a frequency proportional to the speed of said engine, a speed sensitive network operable in response to said source of alternating current voltage for generating a direct current speed signal corresponding to the operational speed of said engine, a speed setting device operable manually to provide a speed setting voltage, a modulation network having an output and being adapted to modulate a suitable alternating current voltage in response to said direct current speed signal and said speed setting voltage, a control amplifier connected to the output of said modulation network, and means responsive to the output of said amplifier for controlling the operation of said variable exhaust nozzle discharge area.

27. In apparatus for controlling a jet engine having a fuel valve, the combination comprising a source of alternating current voltage having a frequency proportional to the speed of said engine, a speed sensitive network operable in response to said source of alternating current voltage for generating a direct current speed signal corresponding to the operational speed of said engine, a speed setting device operable manually to provide a speed setting voltage, a modulation network having an output and being adapted to modulate a suitable alternating current voltage in response to said direct current speed signal and said speed setting voltage, and a control amplifier connected to the output of said modulation network for controlling the operation of said fuel valve.

28. In apparatus for controlling a jet engine having a variable exhaust nozzle discharge area and a fuel valve, the combination comprising a speed-sensitive network for generating a direct current speed signal which corresponds to the operational speed of said engine, a temperature-sensitive network for generating a direct current temperature signal corresponding to the operational temperature of said engine, a first modulation network having an output and being adapted for generating a first alternating current signal in response to said direct current speed signal and said direct current temperature signal, a first control amplifier connected to the output of the first modulation network for controlling the operation of said variable exhaust nozzle discharge area, a second modulation network having an output and being adapted for generating a second alternating current signal in response to said direct current speed signal and said direct current temperature signal, and a second control amplifier connected to the output of the second modulation network for controlling the operation of said fuel valve.

29. In apparatus for controlling a jet engine having a variable exhaust nozzle discharge area and a fuel valve, the combination comprising a speed-sensitive network for generating a D. C. speed signal corresponding to the operational speed of said engine, a speed setting operable manually to provide a speed setting voltage, a first modulation network having an output and being adapted for generating a first A. C. signal in response to said D. C. speed signal and said speed setting voltage, a first control amplifier connected to the output of the first modulation network for controlling the operation of said variable exhaust nozzle discharge area, a second modulation network having an output and being adapted for generating a second A. C. signal in response to said D. C. speed signal and said speed setting voltage, and a second control amplifier connected to the output of the second modulation network for controlling the operation of said fuel valve.

30. In apparatus for controlling a jet engine having a variable exhaust nozzle discharge area and a fuel valve, the combination comprising a temperature-sensitive network for generating a D. C. temperature signal corresponding to the operational temperature of said engine, a temperature setting operable manually to provide temperature setting voltage, a first modulation network having an output and being adapted for generating a first A. C. signal in response to said D. C. temperature signal and said temperature setting voltage, a first control amplifier connected to the output of the first modulation network for controlling the operation of said variable exhaust nozzle discharge area, a second modulation network having an output and being adapted for generating a second A. C. signal in response to said D. C. temperature signal and said temperature setting voltage, and a second control amplifier connected to the output of the second modulation network for controlling the operation of said fuel valve.

31. In apparatus for controlling a jet engine having a variable exhaust nozzle discharge area and a fuel valve, the combination comprising a speed-sensitive network for generating a D. C. speed signal which corresponds to the operational speed of said engine, a speed setting operable manually to provide a speed setting voltage, a temperature-sensitive network for generating a D. C. temperature signal corresponding to the operational temperature of said engine, a first modulation network for generating a first A. C. signal in response to said D. C. speed signal and said speed setting voltage for controlling the operation of said variable exhaust nozzle discharge area, and a second modulation network for generating a second A. C. signal in response to said D. C. temperature signal for use in controlling the operation of said fuel valve.

32. The apparatus of claim 3 including a speed setting operable manually to provide a speed setting voltage, with said second modulation network being responsive to said D. C. temperature signal and said speed setting voltage.

33. The apparatus of claim 3 including a speed setting operable manually to provide a speed setting voltage, with the first modulation network being responsive to both the D. C. speed signal and the speed setting voltage, and the second modulation network being responsive to the D. C. temperature signal and the speed setting voltage.

34. The apparatus of claim 3 including a temperature setting operable manually to provide a temperature setting voltage, with the first modulation network being responsive to both the D. C. speed signal and the temperature setting voltage.

35. The apparatus of claim 3 including a temperature setting operable manually to provide a temperature setting voltage, with the second modulation network being responsive to both the D. C. temperature signal and the temperature setting voltage.

36. The apparatus of claim 3 including a temperature setting operable manually to provide a temperature setting voltage, with the first modulation network generating a first A. C. signal in response to said D. C. speed signal and said temperature setting voltage, and a second modulation network generating a second A. C. signal in response to said D. C. temperature signal and said temperature setting voltage.

37. The apparatus of claim 3 characterized by a speed setting operable manually to provide a speed setting voltage and a temperature setting operable manually to provide a temperature setting voltage, with the first modulation network generating a first A. C. signal in response to the D. C. speed signal, the speed setting voltage and the temperature setting voltage.

38. The apparatus of claim 3 characterized by a speed setting operable manually to provide a speed setting voltage and a temperature setting operable manually to provide a temperature setting voltage, with the second modulation network generating a second A. C. signal in response to the D. C. temperature signal, the speed setting voltage and the temperature setting voltage.

39. The apparatus of claim 3 including respective speed and temperature settings operable manually to provide speed and temperature setting voltages respectively, with the first modulation network generating a first alternating current signal in response to the direct current speed signal, the speed setting voltage and the temperature setting voltage, and the second modulation network generating a second alternating current signal in response to the direct current temperature signal, the speed setting voltage and the temperature setting voltage.

40. In a power regulator for controlling the operation of a jet engine having a variable exhaust nozzle area and circuits for generating a direct-current speed signal having a polarity responsive to the relative speed of said engine and a direct-current temperature signal in response to the temperature of said engine, the combination of a modulator having a connection to said direct-current temperature signal generating circuit, and a phase-sensitive apparatus connected to respond to the output of said modulator for controlling the exhaust nozzle area of said engine, such that a negative polarity speed signal causes the exhaust nozzle area to decrease and a positive direct-current temperature signal causes the exhaust nozzle area to increase.

References Cited in the file of this patent

UNITED STATES PATENTS

| | | |
|---|---|---|
| 2,313,147 | Hoekstra | Mar. 9, 1943 |
| 2,329,224 | Short | Sept. 14, 1943 |
| 2,330,500 | Leifer | Sept. 28, 1943 |
| 2,338,080 | Brown | Dec. 28, 1943 |
| 2,359,727 | Brown | Oct. 3, 1944 |
| 2,383,473 | Dawson et al | Aug. 28, 1945 |
| 2,482,892 | Barwick | Sept. 27, 1949 |
| 2,492,472 | Fortescue | Dec. 27, 1949 |
| 2,493,669 | Gray | Jan. 3, 1950 |
| 2,519,265 | MacDonald | Aug. 15, 1950 |
| 2,520,967 | Schmitt | Sept. 5, 1950 |
| 2,537,676 | Knauth et al. | Jan. 9, 1951 |
| 2,537,677 | Knauth et al. | Jan. 9, 1951 |
| 2,546,415 | Alcock | Mar. 27, 1951 |
| 2,551,229 | Alford et al. | May 1, 1951 |
| 2,551,372 | Haltenberger | May 1, 1951 |
| 2,558,592 | Starkey et al. | June 26, 1951 |
| 2,662,372 | Offner | Dec. 15, 1953 |
| 2,699,524 | Jackson et al. | Jan. 11, 1955 |
| 2,707,866 | Noon et al. | May 10, 1955 |

FOREIGN PATENTS

| | | |
|---|---|---|
| 626,045 | Great Britain | July 8, 1949 |